(12) United States Patent
Hwang et al.

(10) Patent No.: US 11,218,582 B2
(45) Date of Patent: Jan. 4, 2022

(54) ELECTRONIC DEVICE

(71) Applicant: Samsung Electronics Co., Ltd., Suwon-si (KR)

(72) Inventors: Hochul Hwang, Yongin-si (KR); Janghoon Kang, Seoul (KR); Youngbae Park, Seoul (KR); Hanbom Park, Suwon-si (KR); Byounguk Yoon, Hwaseong-si (KR); Kyunghee Lee, Seoul (KR); Joonrae Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/484,683

(22) PCT Filed: Jan. 31, 2018

(86) PCT No.: PCT/KR2018/001326
§ 371 (c)(1),
(2) Date: Aug. 8, 2019

(87) PCT Pub. No.: WO2018/147588
PCT Pub. Date: Aug. 16, 2018

(65) Prior Publication Data
US 2020/0059544 A1 Feb. 20, 2020

(30) Foreign Application Priority Data
Feb. 8, 2017 (KR) .................. 10-2017-0017567

(51) Int. Cl.
*H04M 1/02* (2006.01)
*H04M 1/03* (2006.01)
(Continued)

(52) U.S. Cl.
CPC ....... *H04M 1/0266* (2013.01); *H04M 1/0249* (2013.01); *H04M 1/03* (2013.01);
(Continued)

(58) Field of Classification Search
CPC .... H04M 1/0266; H04M 1/0249; H04M 1/03; H04M 2201/34; H04M 2201/36;
(Continued)

(56) References Cited

U.S. PATENT DOCUMENTS

2009/0003630 A1    1/2009   Kuroda et al.
2010/0061040 A1    3/2010   Dabov et al.
(Continued)

FOREIGN PATENT DOCUMENTS

CN    104869515 A    8/2015
JP    2010-119032 A    5/2010
(Continued)

OTHER PUBLICATIONS

European Extended Search Report dated Oct. 9, 2019, issued in European Application No. 18750893.2-1216.

*Primary Examiner* — Yuwen Pan
*Assistant Examiner* — Fatuma G Sherif
(74) *Attorney, Agent, or Firm* — Jefferson IP Law, LLP

(57) ABSTRACT

An electronic device according to various embodiments of the present invention can comprise: a housing including a first plate, a second plate, and a side member surrounding the space between the first plate and the second plate; a processor arranged in the space; a display exposed through a part of the first plate; a communication circuit arranged in the space; a piezoelectric actuator arranged in the space and providing vibration to the first plate; a speaker arranged in the space near the edge of the first plate; an audio processing circuit arranged in the space and electrically connected to the piezoelectric actuator and the speaker; and a memory arranged in the space and electrically connected to the processor. According to various embodiments, when instructions, which can be included by the memory, are executed, the processor wirelessly connects to an external device by (Continued)

using the communication circuit, receives an audio signal through the communication circuit, and provides the audio signal to the audio processing circuit. According to various embodiments, the side member can be separated from or integrated with the second plate. According to various embodiments, the audio processing circuit can provide, to the piezoelectric actuator, a first signal having a first frequency band and can provide, to the speaker, a second frequency band lower than the first frequency band, on the basis of at least a part of the audio signal. Additional various embodiments are possible.

16 Claims, 22 Drawing Sheets

(51) Int. Cl.
  *H04R 1/24* (2006.01)
  *H04R 3/00* (2006.01)
  *H04R 9/06* (2006.01)
  *H04R 17/00* (2006.01)
  *H04R 3/14* (2006.01)
  *H04R 7/04* (2006.01)

(52) U.S. Cl.
  CPC ............... *H04R 1/24* (2013.01); *H04R 3/002* (2013.01); *H04R 9/06* (2013.01); *H04R 17/00* (2013.01); *H04M 2201/34* (2013.01); *H04M 2201/36* (2013.01); *H04M 2201/38* (2013.01); *H04M 2250/06* (2013.01); *H04R 3/14* (2013.01); *H04R 7/045* (2013.01); *H04R 2430/03* (2013.01); *H04R 2499/11* (2013.01)

(58) Field of Classification Search
  CPC ............... H04M 2201/38; H04M 2250/06; H04R 1/24; H04R 3/002; H04R 9/06; H04R 17/00; H04R 3/14; H04R 7/045; H04R 2430/03; H04R 2499/11; H04R 2440/05
  See application file for complete search history.

(56) References Cited

U.S. PATENT DOCUMENTS

| | | | |
|---|---|---|---|
| 2010/0080085 A1 | 4/2010 | Shin et al. | |
| 2011/0025927 A1* | 2/2011 | Yana | H04R 5/02 348/739 |
| 2015/0010176 A1* | 1/2015 | Schevciw | H04R 23/02 381/190 |
| 2015/0063595 A1* | 3/2015 | Kemppinen | H04R 1/24 381/101 |
| 2015/0237440 A1* | 8/2015 | Fromel | H04R 1/22 381/334 |
| 2016/0014247 A1* | 1/2016 | Behles | H04M 1/035 455/566 |
| 2019/0320253 A1* | 10/2019 | Park | H04R 1/021 |

FOREIGN PATENT DOCUMENTS

| | | |
|---|---|---|
| JP | 2013-219583 A | 10/2013 |
| JP | 2014-197854 A | 10/2014 |
| KR | 10-0510355 B1 | 8/2005 |
| KR | 10-2010-0036503 A | 4/2010 |
| KR | 10-2011-0051277 A | 5/2011 |
| KR | 10-1576134 B1 | 12/2015 |
| KR | 10-1598413 B1 | 3/2016 |
| WO | 2013093552 A1 | 6/2013 |

* cited by examiner

FIG. 4
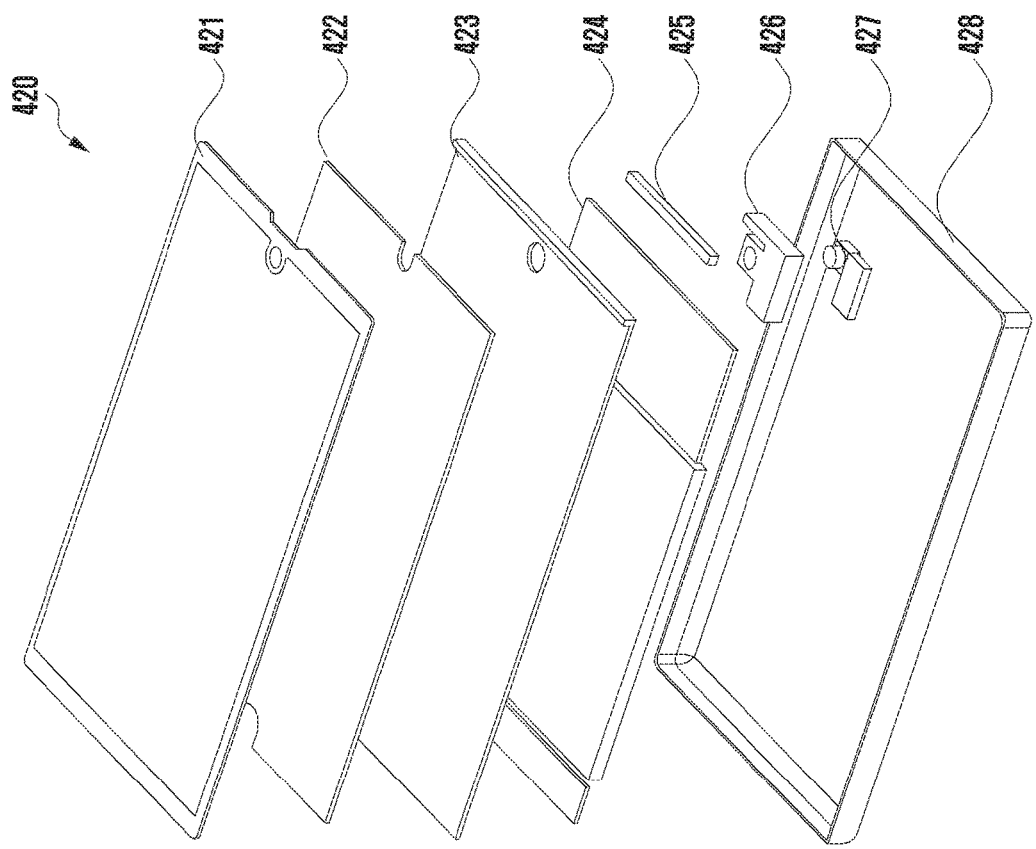
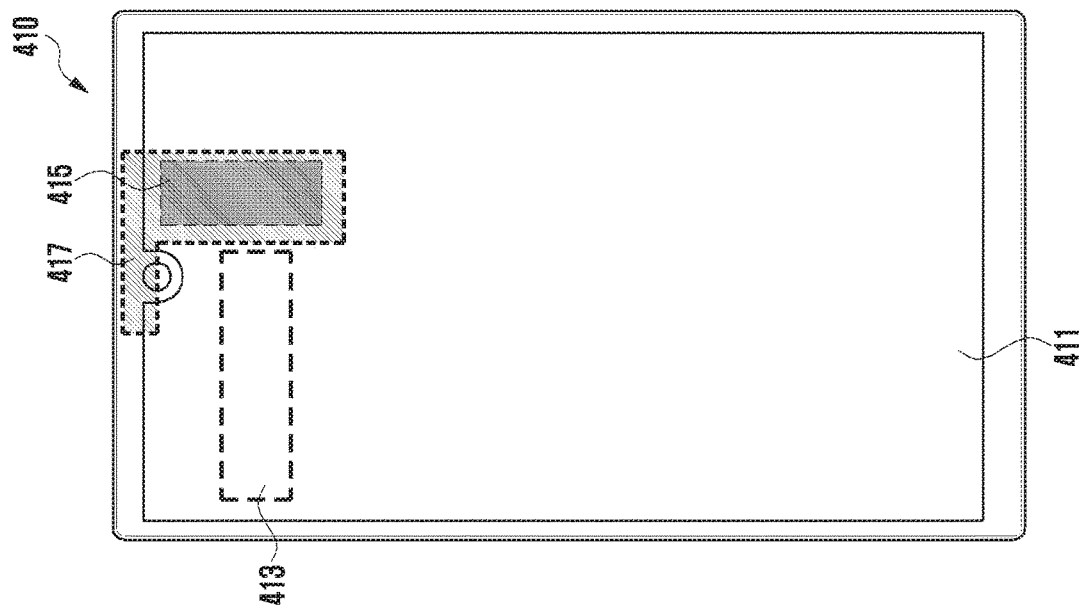

FIG. 5A
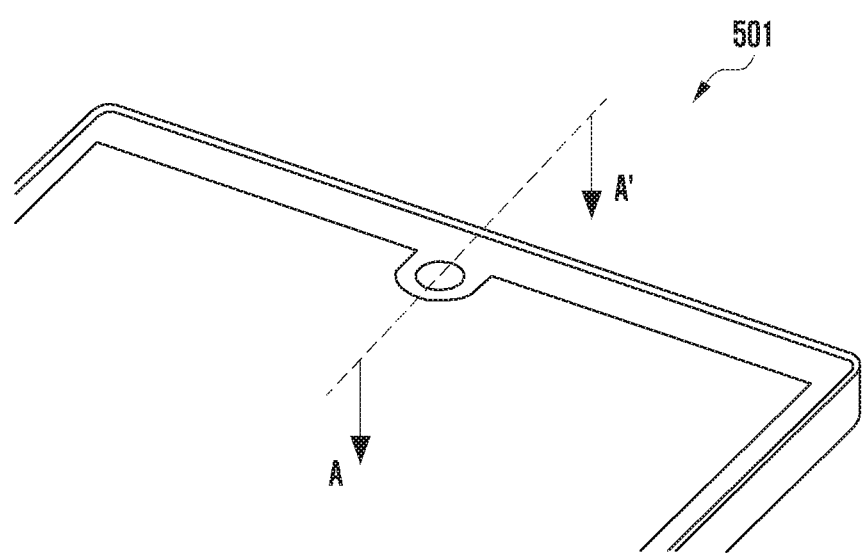
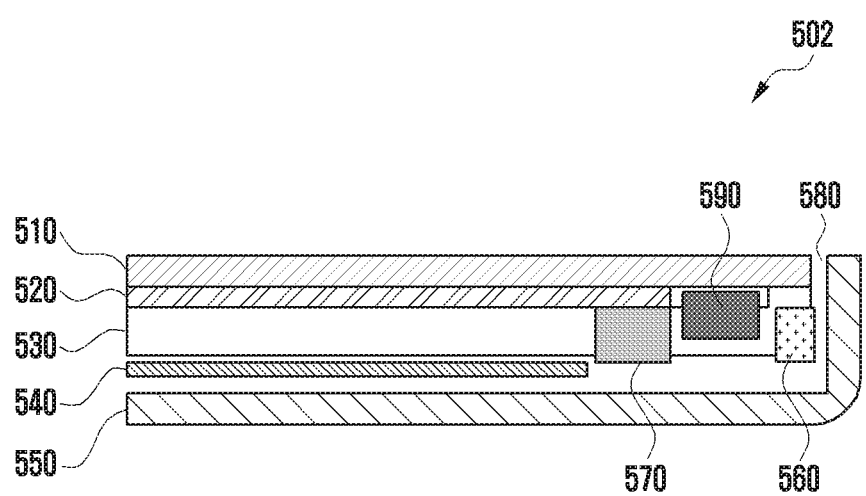

FIG. 5B
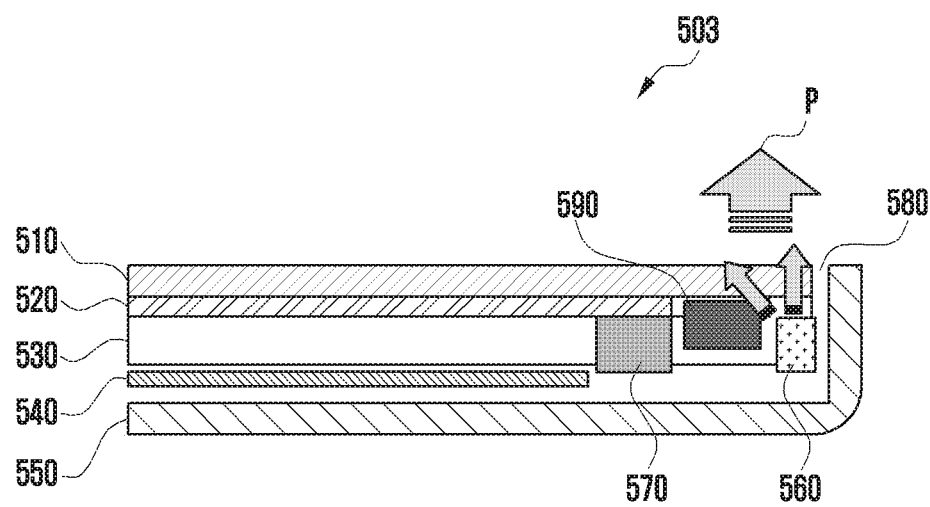
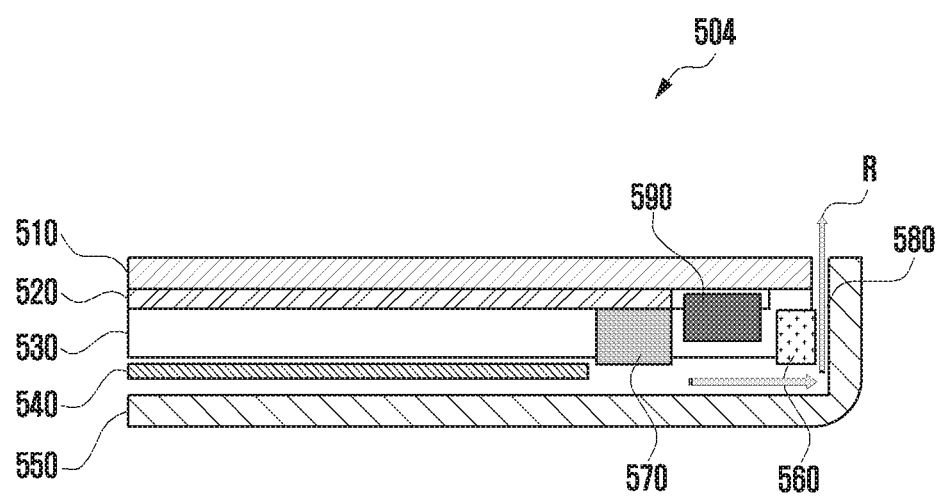

es a block diagram of an electronic device accord-
ELECTRONIC DEVICE

TECHNICAL FIELD

Various embodiments of the disclosure relate to an electronic device having a piezoelectric actuator.

BACKGROUND ART

Speakers used for portable electronic devices such as mobile phones, PDAs, and PMPs convert electric signals into sounds in the same manner as existing conventional speakers do. Accordingly, in order for a conventional electronic device to provide sound, the sound to be delivered is initially converted into an electric signal, the electric signal is transferred to a speaker by using a wire or a radio wave, and the vibrating plate of the speaker vibrates air so as to regenerate/deliver the sound. While undergoing these processes, existing speakers not only occupy a large space, but also need to maintain a fixed shape, such as a conical or elliptical shape, in order to generate resonance.

DISCLOSURE OF INVENTION

Technical Problem

There has recently been widespread use of devices that provide sounds through piezoelectric speakers, which employ piezoelectric actuators, instead of conventional speakers. Such piezoelectric speakers may not properly provide low-frequency sounds due to structural or performance-related issues. For example, it may be difficult for a piezoelectric speaker to provide a sound with the same amplitude as that of a sound generated by a conventional speaker's vibrating plate, due to characteristics related to the thickness or material of the contact medium. As such, piezoelectric speakers may fail to provide low-frequency sounds with large amplitudes.

Various embodiments of the disclosure seek to provide an electronic device capable of providing a high-frequency sound and a low-frequency sound by using a piezoelectric actuator or a speaker.

Solution to Problem

An electronic device according to various embodiments of the disclosure may include: a housing including a first plate, a second plate, and a side member surrounding a space between the first plate and the second plate; a processor arranged inside the space; a display exposed through a part of the first plate; a communication circuit arranged inside the space; a piezoelectric actuator arranged inside the space so as to provide vibration to the first plate; a speaker arranged inside the space in a position adjacent to a periphery of the first plate; an audio processing circuit arranged in the space and electrically connected to the piezoelectric actuator and the speaker; and a memory arranged inside the space and electrically connected to the processor. According to various embodiments, the memory may include instructions that, when executed, cause the processor to wirelessly connect to an external device by using the communication circuit, to receive an audio signal through the communication circuit, and to provide the audio signal to the audio processing circuit. According to various embodiments, the side member may be separated from or integrated with the second plate. According to various embodiments, the audio processing circuit may provide a first signal having a first frequency band to the piezoelectric actuator at least partially on the basis of the audio signal, and may provide a second signal having a second frequency band, which is lower than the first frequency band, to the speaker.

Advantageous Effects of Invention

An electronic device according to various embodiments of the disclosure can efficiently provide both a high-frequency sound and a low-frequency sound by using a piezoelectric actuator and a speaker together.

An electronic device according to various embodiments of the disclosure can provide sounds in all frequency bands by separating an audio signal into a high-frequency signal and a low-frequency signal by using a filter and outputting the same separately.

BRIEF DESCRIPTION OF DRAWINGS

FIG. 4 is a diagram schematically illustrating the structure of an electronic device according to various embodiments of the disclosure.

FIG. 5A is a diagram schematically illustrating the section of an electronic device according to various embodiments of the disclosure.

FIG. 5B is a diagram illustrating the operation of an electronic device according to various embodiments of the disclosure.

MODE FOR THE INVENTION

Figure 1:
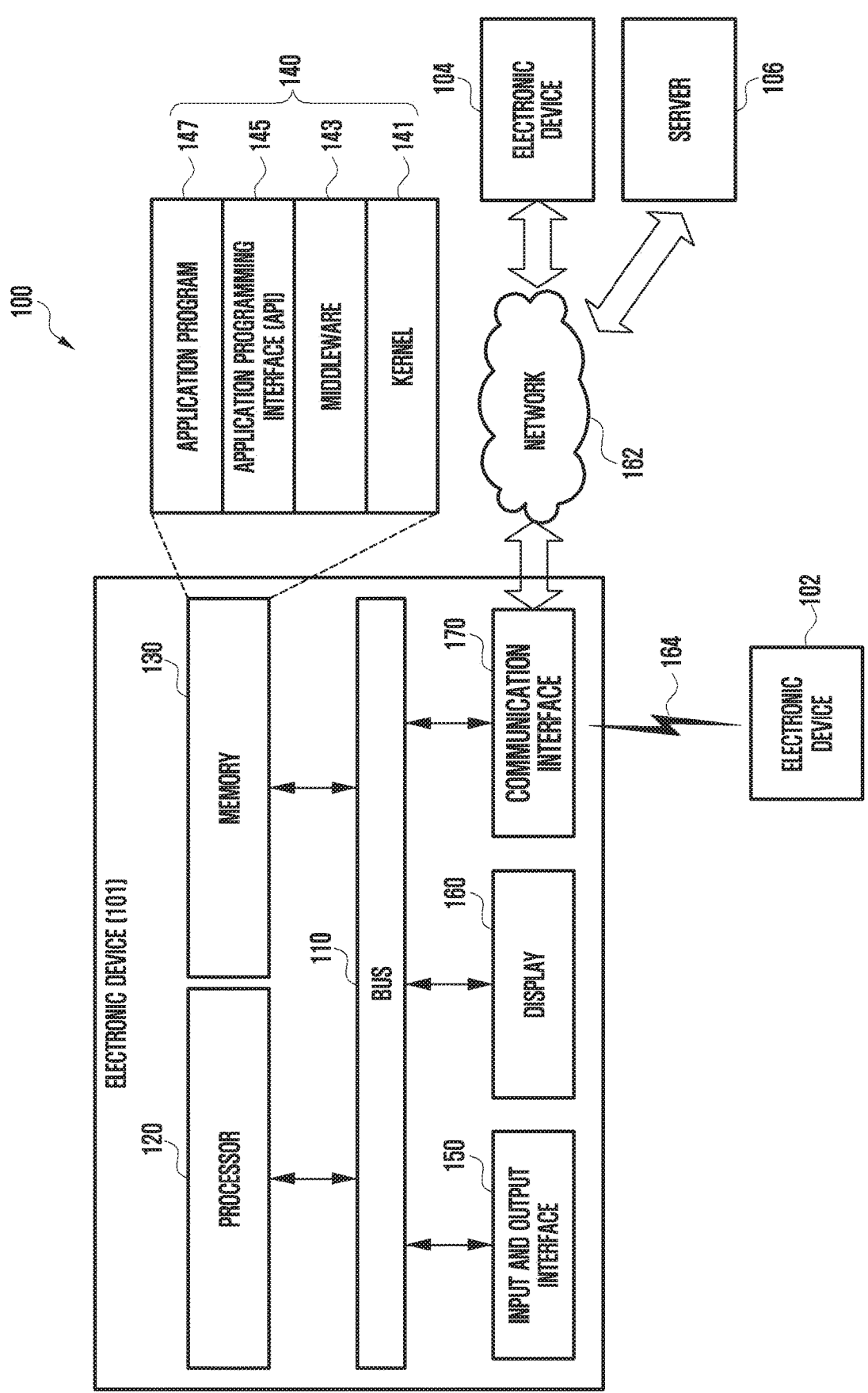
FIG. 1 illustrates an electronic device inside a network environment according to various embodiments of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™ Apple TV™, or Google TV™), game consoles (e.g., Xbox™ or PlayStation™) electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Referring to FIG. 1, according to various embodiments, an electronic device 101 in a network environment is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., a command or an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
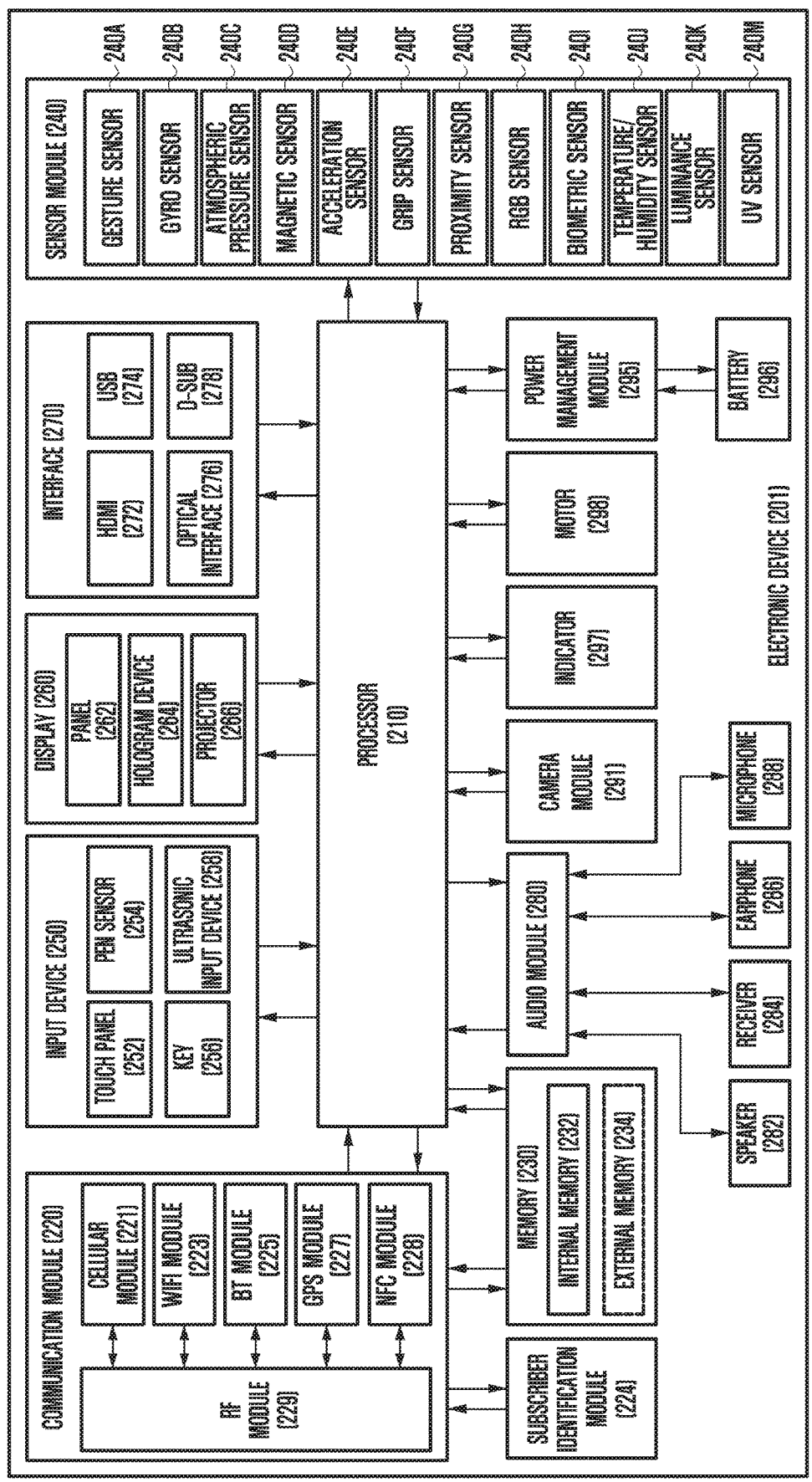
FIG. 2 is a block diagram of an electronic device according to various embodiments of the disclosure.

FIG. 2 illustrates a block diagram of an electronic device, according to various embodiments. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The subscriber identification module 224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
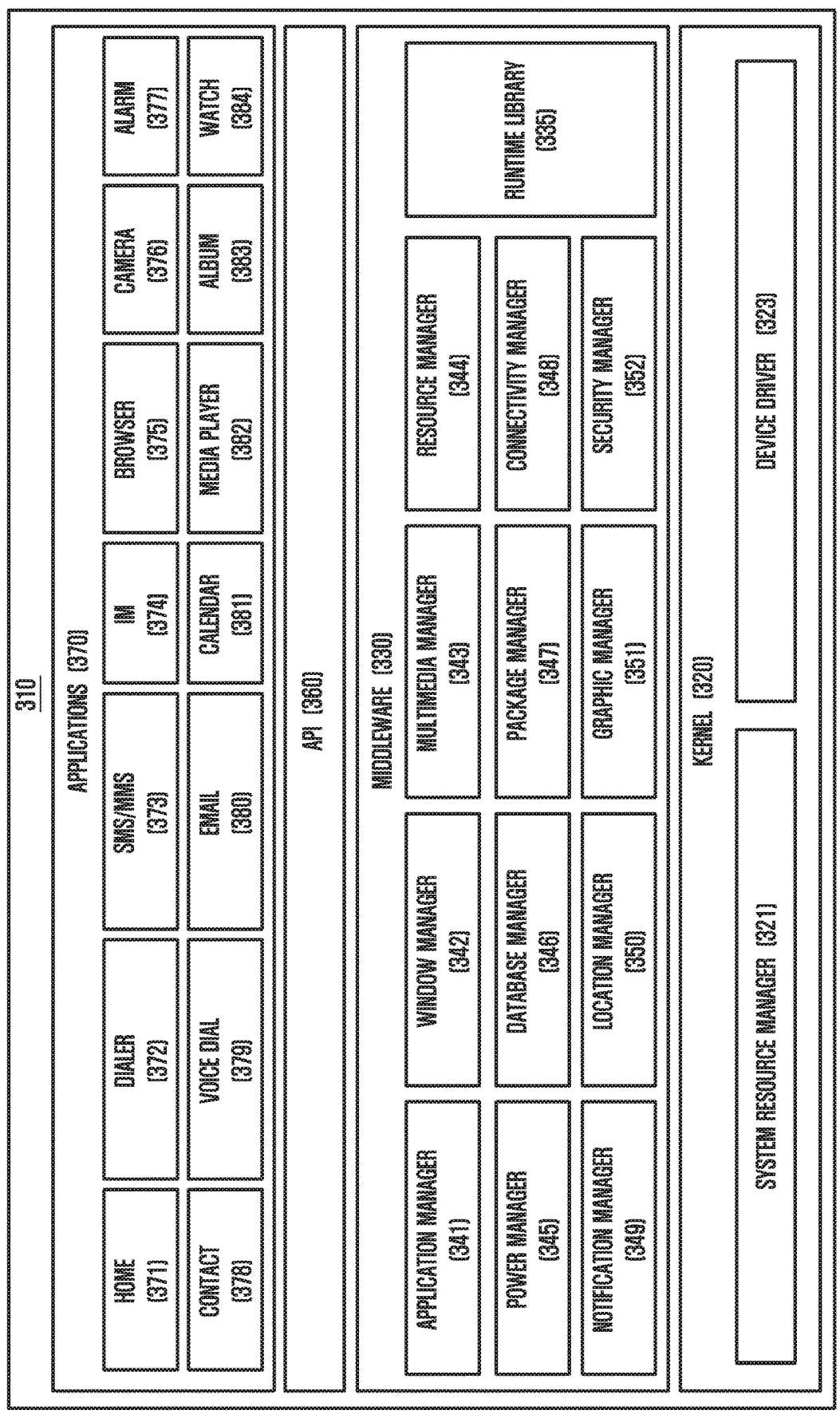
FIG. 3 is a block diagram of a program module according to various embodiments of the disclosure.

FIG. 3 illustrates a block diagram of a program module, according to various embodiments. According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery or power, and may provide power information for an operation of an electronic device. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

An electronic device according to an embodiment of the disclosure may include: a housing including a first plate, a second plate spaced apart from the first plate, and a side member surrounding a space between the first plate and the second plate, the side member being separated from or integrated with the second plate; a display exposed through a part of the first plate; a communication circuit arranged inside the space; a piezoelectric actuator arranged inside the space so as to provide vibration to the first plate; a speaker arranged inside the space in a position adjacent to a periphery of the first plate; an audio processing circuit arranged in the space and electrically connected to the piezoelectric actuator and the speaker; a processor arranged inside the space and electrically connected to the display, the communication circuit, and the audio processing circuit; and a memory arranged inside the space and electrically connected to the processor. According to an embodiment of the disclosure, the memory may include instructions that, when executed, cause the processor to wirelessly connect to an external device by using the communication circuit, to receive an audio signal through the communication circuit, and to provide the audio signal to the audio processing circuit. According to an embodiment of the disclosure, the audio processing circuit may provide a first signal having a first frequency band to the piezoelectric actuator at least partially on the basis of the audio signal, and may provide a second signal having a second frequency band, which is lower than the first frequency band, to the speaker.

According to an embodiment, the audio processing circuit may include an analog codec, a first filter, and a second filter. According to an embodiment, the first filter may be electrically connected between the analog codec and the piezoelectric actuator, and the second filter may be electrically connected between the analog codec and the speaker.

According to an embodiment, the first filter may include a high-pass filter, and the second filter may include a low-pass filter.

According to an embodiment, the audio processing circuit may provide a signal, which is obtained by filtering the audio signal by using the first filter, to the piezoelectric actuator, and may provide a signal, which is obtained by filtering the audio signal by using the second filter, to the speaker.

According to an embodiment, the piezoelectric actuator may be mounted on the display. According to an embodiment, the piezoelectric actuator may be mounted on one surface of the display, which faces the space. According to an embodiment, the piezoelectric actuator may be mounted on the side member.

According to an embodiment, the housing may include an opening formed in the first plate or formed adjacent to the first plate. According to an embodiment, the housing may further contain a structure configured to form a first sound passage, which extends from the opening in a first direction, and to form a second sound passage, which extends from a part of the first sound passage to the speaker in a second direction. According to an embodiment, the second direction may be different from the first direction. According to an embodiment, the second direction may be substantially perpendicular to the first direction.

According to an embodiment, the opening may be formed on a part of a boundary between the first plate and the side member. According to an embodiment, the opening may be formed at an upper-end center of the first plate. According to an embodiment, the opening may be formed to abut a center part of an upper-end boundary of the display.

According to an embodiment, the housing may include an opening formed in the side member. According to an embodiment, the electronic device may further include a structure arranged in the space, the structure having a sound passage extending from the opening to the speaker.

According to an embodiment, the electronic device may further include a sensor arranged at an upper-end center inside the space. According to an embodiment, the first sound passage and the second sound passage may be connected from the opening to the speaker while avoiding an area in which the sensor is arranged.

An electronic device according to an embodiment of the disclosure may include: a housing including a first plate, a second plate spaced apart from the first plate, and a side member surrounding a space between the first plate and the second plate; a processor arranged inside the space; a display exposed through a part of the first plate; a piezoelectric actuator arranged inside the space so as to provide vibration to the first plate; a speaker arranged inside the space; an audio processing circuit arranged inside the space and electrically connected to the piezoelectric actuator and the speaker; and a memory arranged inside the space and electrically connected to the processor. According to an embodiment, the memory may include instructions that, when executed, cause the processor to provide an audio signal to the audio signal processing circuit. According to an embodiment, the audio processing circuit may provide a first signal having a first frequency band to the piezoelectric actuator at least partially on the basis of the audio signal, and may provide a second signal having a second frequency band, which is lower than the first frequency band, to the speaker.

An electronic device according to an embodiment of the disclosure may include: a housing; a display at least partially exposed to an outside of the housing; a piezoelectric actuator arranged on the display inside the housing so as to provide vibration to the display; a speaker arranged inside the housing; an audio processing circuit electrically connected to the piezoelectric actuator and the speaker; a processor arranged inside the housing and electrically connected to the display and the audio processing circuit; and a memory arranged inside the housing and electrically connected to the processor. According to an embodiment, the memory may include instructions that, when executed, cause the processor to provide a signal corresponding to an audio signal to the piezoelectric actuator and to the speaker by using the audio signal processing circuit. According to an embodiment, the piezoelectric actuator may provide vibration in a first frequency band on the basis of the signal corresponding to the audio signal, and the speaker may output a sound in a second frequency band, which is lower than the first frequency band, on the basis of the signal corresponding to the audio signal. According to an embodiment, the sound output by the speaker may be discharged out of the electronic device through a gap formed on a boundary between the housing and the display.

According to an embodiment, the housing may further include an opening formed adjacent to the display. According to an embodiment, the sound output by the speaker may be discharged out of the electronic device through the opening.

According to an embodiment, the electronic device may further include a structure configured to form a sound passage extending from the speaker to the opening, inside the housing.

According to an embodiment, the sound passage of the structure may include a first sound passage extending in a first direction from the speaker to one surface of the housing, and a second sound passage extending in a second direction from a part of the first sound passage to the opening.

According to an embodiment, the audio processing circuit may include a first filter configured to filter a first frequency band and a second filter configured to filter a second frequency band. According to an embodiment, the processor may use the audio signal processing circuit so as to provide the signal corresponding to the audio signal, which is filtered by using the first filter, to the piezoelectric actuator and to provide the signal corresponding to the audio signal, which is filtered by using the second filter, to the speaker.

FIG. 4 is a diagram schematically illustrating the structure of an electronic device according to various embodiments of the disclosure. Reference numeral 410 refers to a diagram schematically illustrating the inner configuration of the electronic device according to various embodiments of the disclosure, and reference numeral 420 refers to an exploded view of the electronic device according to various embodiments of the disclosure.

According to an embodiment, the electronic device may include a window 421, a display 411, 422, a housing, a circuit board 424, a speaker 415, 427, and a piezoelectric actuator 413, 425. According to an embodiment, the housing may include a front housing 423 and a rear housing 428. According to an embodiment, the electronic device may further include a battery electrically connected to the circuit board 424. For example, the electronic device may have such a structure that the circuit board 424 (and the battery), the front housing 423, the display 411, 422, and the window 421 are successively mounted on the rear housing 428. For example, the piezoelectric actuator 413, 425 and the speaker 415, 427 may be arranged in a space inside the electronic device.

According to an embodiment, the piezoelectric actuator 413, 425 may be mounted on the display 411, 422 or the housing (for example, the front housing 423) inside the electronic device. According to an embodiment, the piezoelectric actuator 413, 425 may provide vibration to the front housing 423, the display 411, 422, or the window 421. For example, a sound may be provided toward the front surface (for example, the display 411, 422) of the electronic device by vibration transferred by the piezoelectric actuator 413, 425. According to an embodiment, the piezoelectric actuator 413, 425 may provide vibration in response to a signal having a specific frequency band. For example, the piezoelectric actuator 413, 425 may receive a signal having a specific frequency band from a processor (not illustrated) of the electronic device or an audio processing circuit (not illustrated) thereof, and may provide vibration corresponding to the received signal.

According to an embodiment, the speaker 415, 427 may be arranged in a position adjacent to a periphery of the display 411, 422 in the space inside the electronic device. For example, the speaker 415, 427 may be arranged in the upper-end periphery area of the electronic device, inside the electronic device. According to an embodiment, the speaker 415, 427 may output a sound corresponding to an audio signal. For example, the speaker 415, 427 may receive a signal having a specific frequency band from the processor (not illustrated) of the electronic device or the audio processing circuit (not illustrated) thereof, and may output vibration corresponding to the received signal.

According to an embodiment, the electronic device may include an opening for discharging sounds output by the speaker 415, 427 out of the electronic device. According to various embodiments, the opening may be formed in an area on the front portion or side portion of the electronic device. For example, the opening may be formed at the center part of the front upper end of the electronic device. According to an embodiment, the electronic device may further include a structure 417, 426 having a sound passage extending from the opening to the speaker 415, 427. For example, the structure 417, 426 may be configured such that sounds discharged from the speaker 415, 427 are effectively discharged out of the electronic device through the opening.

FIG. 5A is a sectional view of an electronic device according to various embodiments of the disclosure. In FIG. 5A, reference numeral 502 refers to a schematic sectional view of a partial area of the upper end of the electronic device taken along section A-A' illustrated in diagram 501. FIG. 5B is a diagram illustrating the operation of an electronic device according to various embodiments of the disclosure.

According to an embodiment, the electronic device may include a window 510, a display 520, a bracket 530, a circuit board 540 (for example, a flexible printed circuit board (FPCB)), a housing 550, a piezoelectric actuator 560, a speaker 570, and a sensor module 590 (for example, a camera module). For example, the electronic device may have such a structure that the circuit board 540, the bracket 530, and the display 520 are stacked inside the housing 550.

According to an embodiment, the circuit board 540 may be electrically connected to elements (for example, a processor (not illustrated), a battery (not illustrated), the display 520, the piezoelectric actuator 560, the speaker 570, the sensor module 590, and the like) inside the electronic device. According to an embodiment, the bracket 530 may support or retain the inner constituent elements of the electronic device, such as the circuit board 540, the display 520, and the window 510.

According to an embodiment, the electronic device may include a sensor module 590 (for example, a camera module). According to an embodiment, the sensor module 590 may be arranged on the upper end inside the electronic device. According to various embodiments, the sensor module 590 is not an essential constituent element of the electronic device, and may be arranged in various spaces inside the electronic device without being limited to the positions illustrated in FIG. 5A and FIG. 5B.

According to various embodiments, the piezoelectric actuator 560 may be mounted on the inner surface of the display or the housing 550, which is inside the electronic device. According to various embodiments, the piezoelectric actuator 560 may be arranged in various positions in a space inside the electronic device without being limited to the positions illustrated in FIG. 5A and FIG. 5B. According to an embodiment, the piezoelectric actuator 560 may provide vibration to the display 520 or the window 510. For example, a sound P may be output out of the electronic device by the vibration provided by the piezoelectric actuator 560. For example, the electronic device may provide a sound toward the front portion of the electronic device by using the vibration provided by the piezoelectric actuator 560. According to an embodiment, the speaker 570 may be arranged in a position adjacent to a periphery of the display 520 (or the window 510) inside the electronic device. According to an embodiment, the speaker 570 may output a sound corresponding to an audio signal. According to an embodiment, the sound generated by the speaker 570 may be discharged out of the electronic device through a space 580 between the window 510 (or the display 520) and the housing 550. For example, the sound output by the speaker 570 may move through an empty space inside the electronic device so as to be discharged out of the electronic device through the space 580 formed between the display 520 and the housing 550. For example, referring to reference numeral 504, the sound output by the speaker 570 may move along the lower surface of the housing 550 and then may be discharged out of the electronic device along the side surface of the housing 550 and through the empty space 580. According to an embodiment, the space 580 between the window 510 and the side surface of the housing 550 may be a small gap that may be generated when the window 510 and the housing 550 are coupled. According to an embodiment, the electronic device may include an opening for discharging the sound output by the speaker 570 between the window 510 and the housing 550. According to an embodiment, the electronic device may further include a structure (not illustrated) having a sound passage connected from the speaker 570 to the opening. For example, the structure may have a duct structure such that sounds output from the speaker 570 can be discharged out of the electronic device through the opening without leaking in a different direction. For example, if the speaker 570 is arranged on a side surface of the sensor module 590, the speaker 570 and the opening may not be positioned on a straight line. According to an embodiment, the structure may have a sound passage connected from the speaker 570 to the opening while avoiding the area in which the sensor module 590 is occupied such that sounds output by the speaker 570 are discharged out of the electronic device through the opening.

According to various embodiment of the disclosure, the electronic device may provide a sound in a high-frequency band by using the piezoelectric actuator 560, and may provide a sound in a low-frequency band by using the speaker 570. For example, if the piezoelectric actuator 560 is used, low-frequency sounds may fail to be provided efficiently due to performance-related or structural problems. In addition, in the case of a sound output by the speaker 570, the same moves in the space inside the electronic device and is then discharged out of the electronic device. High-frequency sounds have weak diffraction components and thus may not be efficiently provided to the outside of the electronic device. The electronic device according to various embodiments of the disclosure provides a high-frequency sound by using the piezoelectric actuator 560 and provides a low-frequency sound by using the speaker 570, and thus is capable of providing sounds in all frequency bands (high-frequency band and low-frequency band).

According to various embodiments, the electronic device may not include some of the above-mentioned constituent elements, or the arrangement of some constituent elements may be changed. For example, although it is assumed in FIG. 5A and FIG. 5B that the sensor is arranged at the center of the upper end of the electronic device, the position of the sensor may be variously changed.

Figure 6A:
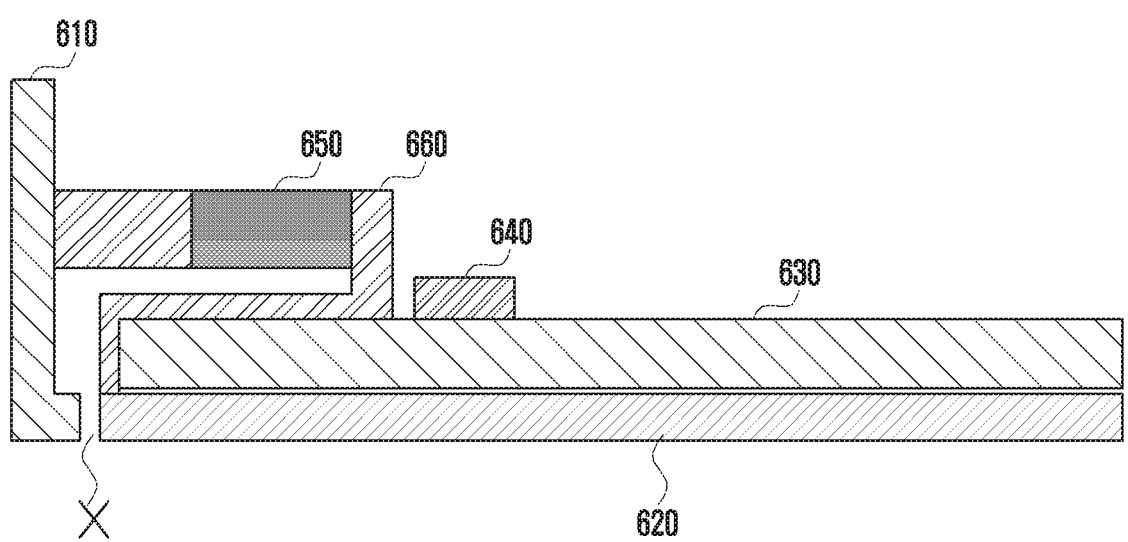
FIG. 6A to FIG. 6C are diagrams schematically illustrating the section of an electronic device according to various embodiments of the disclosure.
Figure 6B:
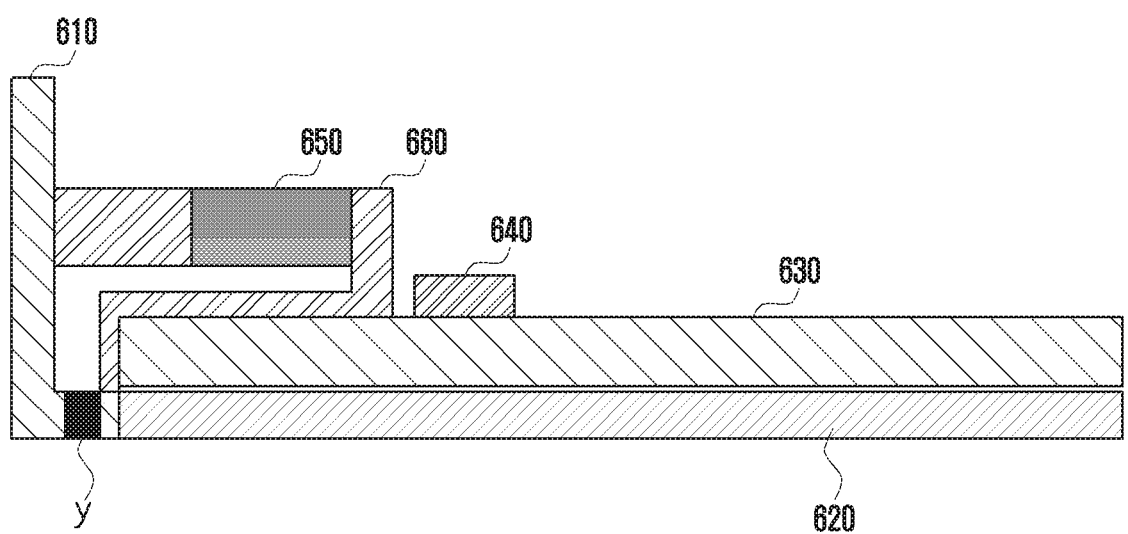
Figure 6C:
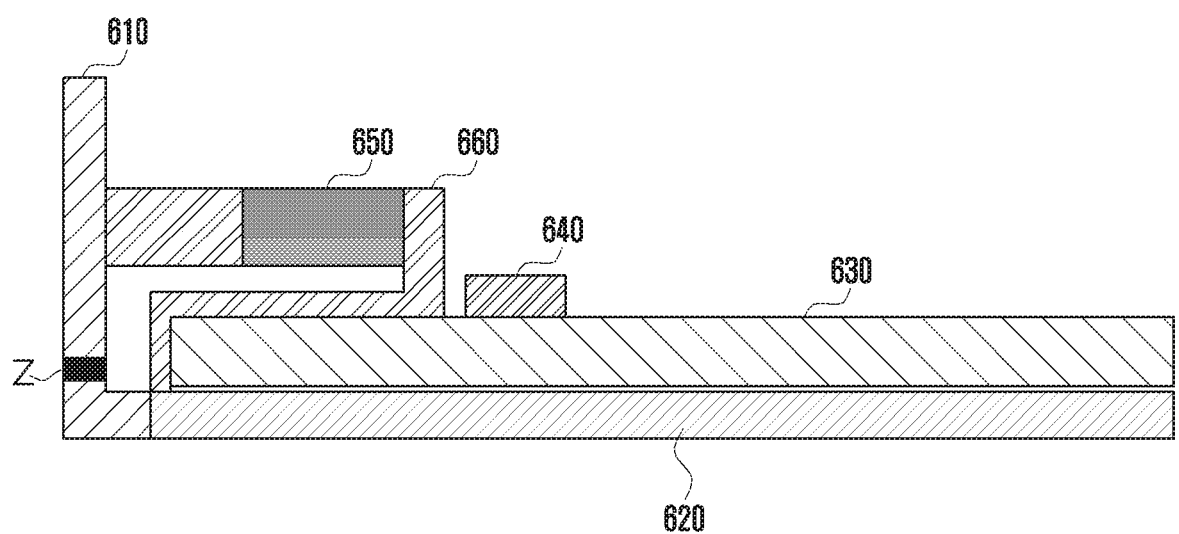

FIG. 6A to FIG. 6C are diagrams schematically illustrating the section of an electronic device according to various embodiments of the disclosure. FIG. 6A to FIG. 6C illustrate the section of a part of the upper end of an electronic device, and the housing on the left side corresponds to the housing on the upper-end periphery of the electronic device.

According to an embodiment, the electronic device may include a housing 610, a window 620, a display 630, a piezoelectric actuator 640, a speaker 650, and a structure 660.

According to an embodiment, the window 620 may be coupled to the display 630. For example, the window 620 and the display 630 may be formed integrally. According to an embodiment, the piezoelectric actuator 640 may be mounted in an area of the display 630 inside the electronic device. According to an embodiment, the piezoelectric actuator 640 may receive a signal having a designated frequency, and may provide vibration corresponding to the received signal to the display 630 or the window 620. According to various embodiments, the piezoelectric actuator 640 may be arranged in various positions inside the electronic device such that the same can provide vibration to the display 630 or the window 620.

According to an embodiment, the speaker 650 may be arranged in a space inside the electronic device. For example, the speaker 650 may be arranged in one area of the upper end inside the electronic device. According to an embodiment, the speaker 650 may output sounds toward the front portion of the electronic device. For example, referring to FIG. 6A, sounds output by the speaker 650 may discharged out of the electronic device through the space x between the housing 610 and the window 620 or the display 630. For example, the space x between the housing 610 and the window 620 may be a small gap that may be generated between abutting parts of the housing 610 and the window 620. Referring to FIG. 6B and FIG. 6C, the electronic device according to various embodiments of the disclosure may include an opening y, z on a part of the housing 610. According to various embodiments, the opening y, z may be formed toward the front portion of the electronic device or toward the side surface of the electronic device. For example, since the space x between the housing 610 and the window 620 is a very small gap formed between two different constituent elements (the housing 610 and the window 620) abutting each other, sounds output by the speaker 650 may not be efficiently discharged out of the electronic device. According to various embodiments, the opening y, z may be configured such that sounds output by the speaker 650 of the electronic device can be discharged out of the electronic device more efficiently.

According to an embodiment, the structure 660 may form a sound passage extending from the opening y, z to the speaker 650. According to various embodiments, the structure 660 may be connected or coupled to the speaker 650. According to an embodiment, the structure 660 may have such a structure or shape that the speaker 650 can be mounted thereon. For example, if the structure 660 is absent, sounds output by the speaker 650 may diffuse in an arbitrary direction in an empty space inside the electronic device. For example, sounds output by the speaker 650 may not be efficiently transferred in the desired direction (to the space between the housing 610 and the window 620, the opening y, z, or the like). According to various embodiments of the disclosure, the structure 660 may efficiently transfer sounds output by the speaker 650 to the space between the housing 610 and the window 620 or the opening y, z. For example, the structure 660 may prevent the sounds output by the speaker 650 from being discharged into another space inside the electronic device, and may induce the sounds output by the speaker 650 in a desired direction.

Figure 7A:
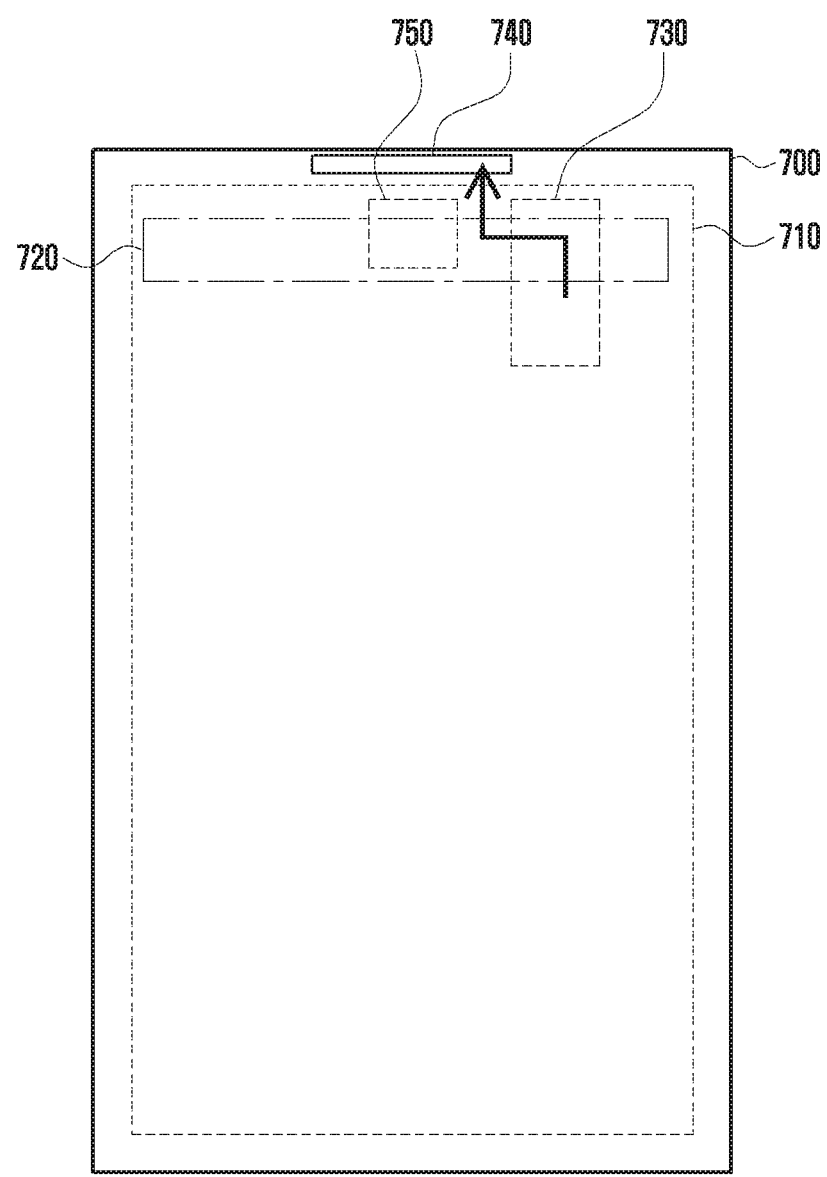
FIG. 7A to FIG. 7C are diagrams schematically illustrating the structure of an electronic device according to various embodiments of the disclosure.
Figure 7B:
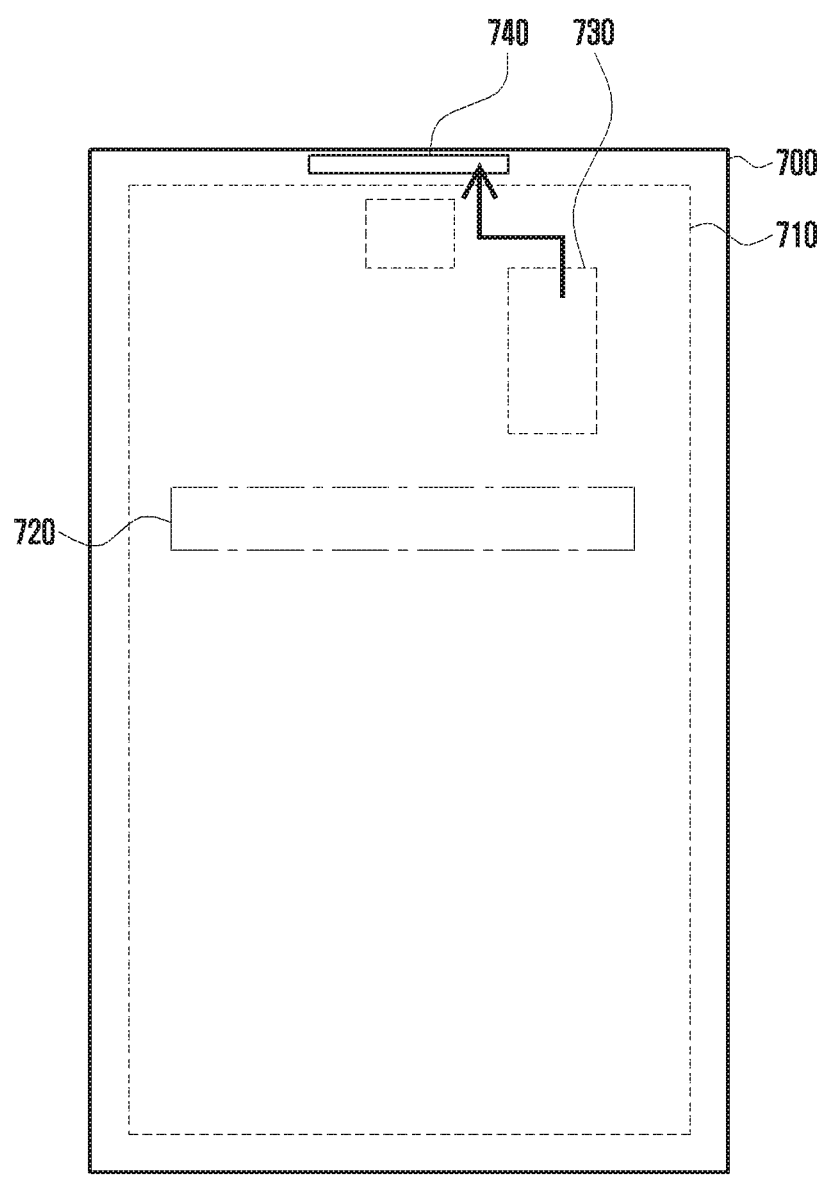
Figure 7C:
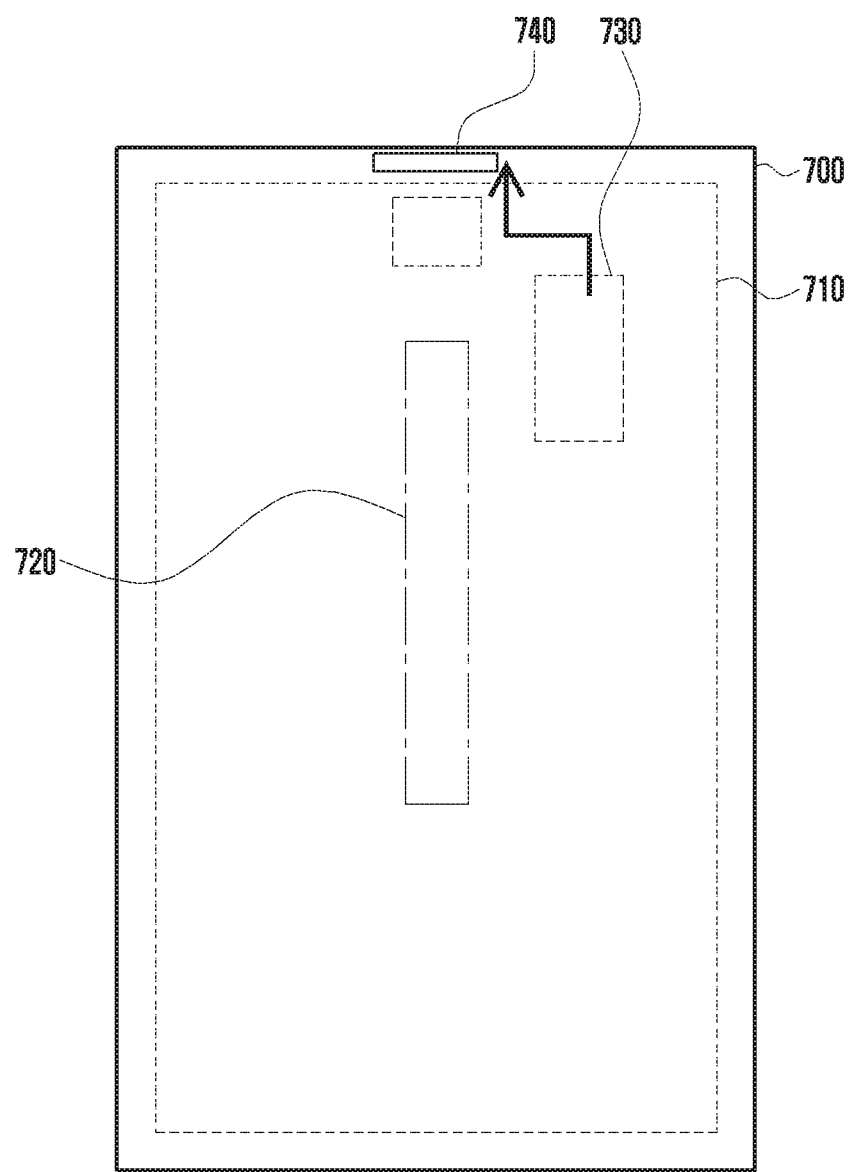

FIG. 7A to FIG. 7C are diagrams schematically illustrating the structure of an electronic device according to various embodiments of the disclosure.

According to various embodiments, the electronic device 700 may include a display 710, a piezoelectric actuator 720, and a speaker 730. For example, the speaker 730 and the piezoelectric actuator 720 may be arranged in a space inside the electronic device 700. According to an embodiment, the electronic device 700 may further include an opening 740 through which sounds output by the speaker 730 are discharged. For example, in FIG. 7A to FIG. 7C, sounds output by the speaker 730 may be discharged out of the electronic device 700 through the opening 740 along the direction indicated by the arrow.

According to an embodiment, the speaker 730 may be arranged in an area adjacent to a periphery of the display 710 of the electronic device 700, inside the electronic device 700. For example, the speaker 730 may be arranged in a position adjacent to the opening 740. For example, the speaker 730 may be positioned adjacent to the opening 740 such that sounds output by the speaker 730 can be easily output through the opening 740. According to various embodiments, the electronic device 700 may further include a sensor module 750 (for example, a camera module). For example, the sensor module 750 may be arranged in the upper-end area inside the electronic device 700. For example, the sensor module 750 may be arranged in an area corresponding to a periphery of the display 710 inside the electronic device 700. For example, the sensor module 750 may be arranged on an outer peripheral portion inside the electronic device 700. According to an embodiment, the sensor module 750 may be arranged in an area adjacent to the opening 740 (for example, on the lower end of the opening 740). According to an embodiment, the speaker 730 may be arranged on a side surface of the sensor module 750. According to an embodiment, the electronic device 700 may further include a structure having a sound passage formed therein and connected from the speaker 730 to the opening 740 such that sounds output by the speaker 730 can be discharged to the opening 740. According to an embodiment, the structure may be arranged to as to avoid the area occupied by the sensor module 750.

According to an embodiment, the piezoelectric actuator 720 may be arranged inside the electronic device 700. For example, the piezoelectric actuator may be mounted on a part of the display 710 or the housing inside the electronic device 700. For example, the piezoelectric actuator 720 may be mounted on a part of the display 710 or the housing so as to provide vibration to the display 710 or the like such that sounds can be output to the front portion of the electronic device 700. According to various embodiments, the piezoelectric actuator 720 may be arranged in various positions in which the same can provide vibration to the display 710. For example, as illustrated in FIG. 7A, the piezoelectric actuator 720 may be arranged in the upper-end area of the electronic device 700 to be adjacent to the sensor module 750 or the speaker 730. For example, as illustrated in FIG. 7B, the piezoelectric actuator 720 may be arranged at the center portion inside the electronic device 700. For example, as illustrated in FIG. 7C, the piezoelectric actuator 720 may be arranged in the lower-end area of the electronic device 700.

According to an embodiment, the piezoelectric actuator 720 may have a rectangular shape as illustrated in FIG. 7A to FIG. 7C. According to various embodiments, the piezoelectric actuator 720 may be arranged in the transverse direction as illustrated in FIG. 7A and FIG. 7B, and may also be arranged in the longitudinal direction as illustrated in FIG. 7C.

Figure 8A:
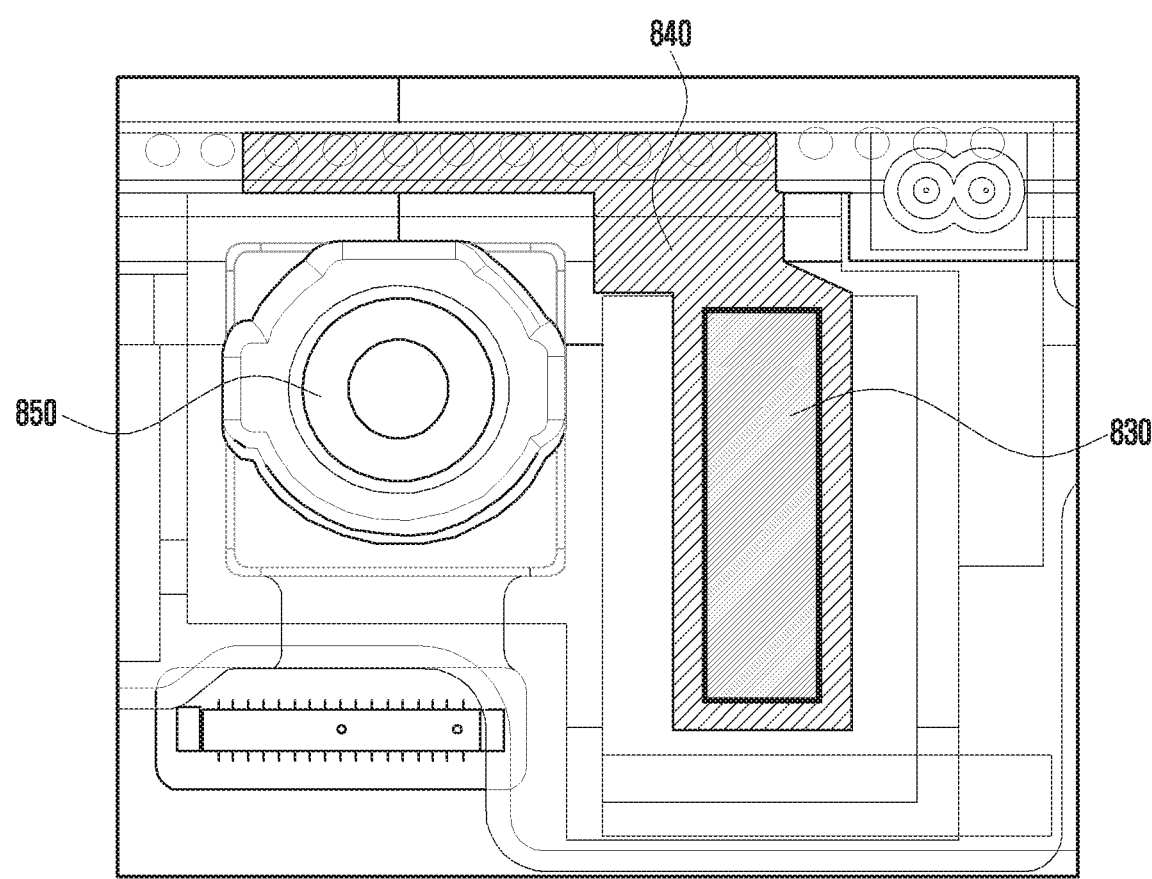
FIG. 8A and FIG. 8B are diagrams illustrating the structure of an electronic device according to various embodiments of the disclosure.
Figure 8B:
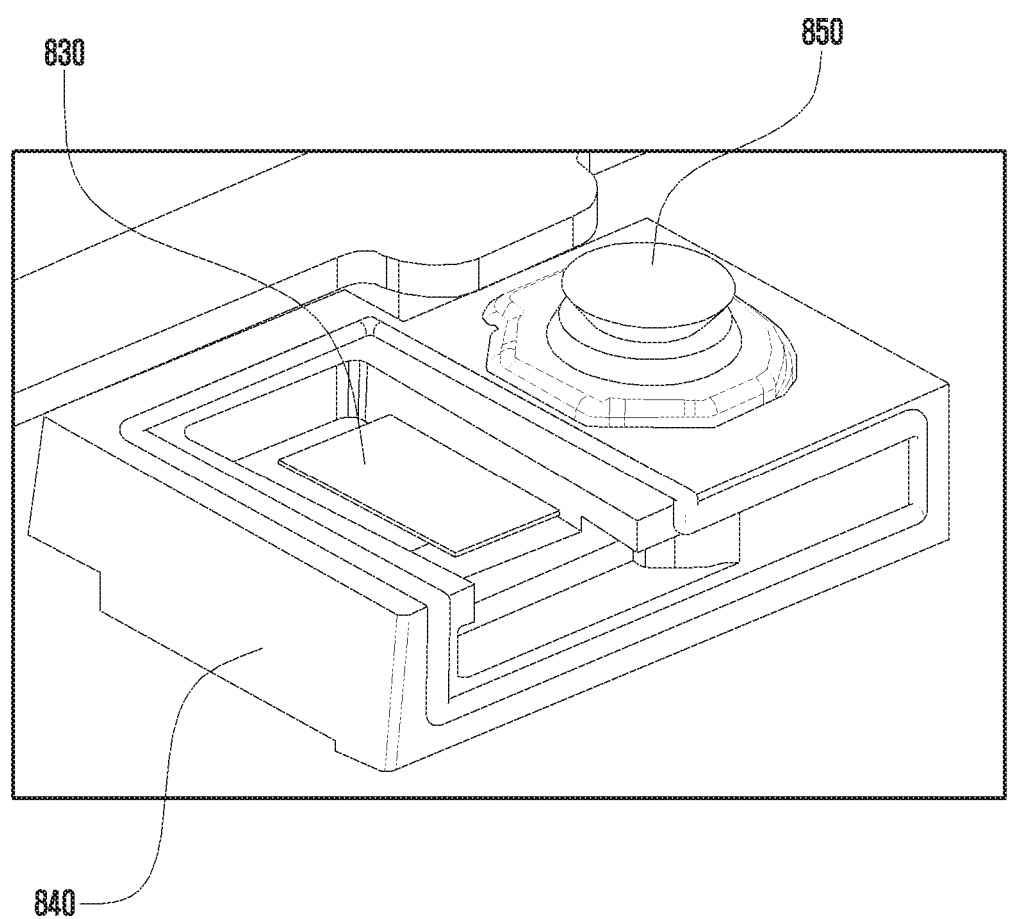

FIG. 8A and FIG. 8B are diagrams illustrating the structure of an electronic device according to various embodiments of the disclosure.

An electronic device according to an embodiment may include a sensor module 850, a speaker 830, and a structure 840. According to an embodiment, the electronic device may further include an opening through which sounds output by the speaker 830 are discharged.

According to an embodiment, the sensor module 850 may be arranged adjacent to the opening. For example, if the opening is formed at the center part of the electronic device, the sensor module 850 may be arranged on the lower end of the opening at the center of the electronic device.

According to various embodiments, the speaker 830 may be arranged adjacent to the opening. For example, the speaker 830 may be arranged in a position adjacent to the opening such that sounds output by the speaker 830 can be easily discharged out of the electronic device through the opening.

According to various embodiments, the speaker 830 may not be positioned to correspond to the opening, or may be arranged to be spaced apart from the opening by at least a predetermined distance, due to arrangement of other constituent elements inside the electronic device, such as the sensor module 850, or due to the spatial limitation inside the electronic device. For example, if both the sensor module 850 and the speaker 830 are arranged adjacent to the opening, the speaker 830 may be arranged on a side surface of the space in which the sensor module 850 is arranged. In this case, sounds output by the speaker 830 may diffuse inside the electronic device, instead of being transferred to the opening efficiently. According to various embodiments, if the electronic device includes a structure 840, sounds output by the speaker 830 may be efficiently transferred to the opening through the structure 840. For example, the structure 840 may form a sound path connected from the speaker 830 to the opening. For example, as illustrated in FIG. 8A and FIG. 8B, the sound passage of the structure 840 may be formed so as to avoid the area occupied by the sensor module 850.

Figure 9:
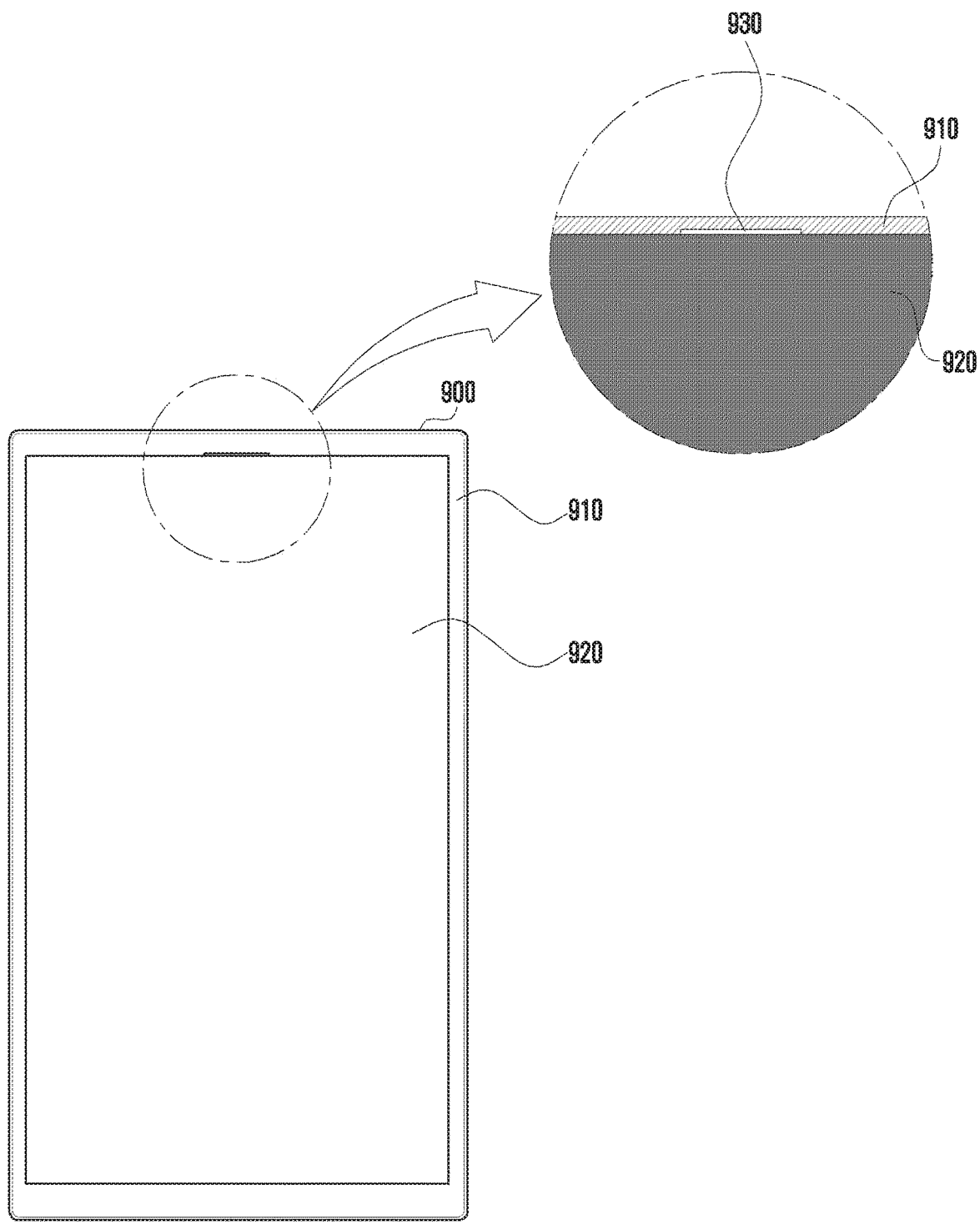
FIG. 9 is a diagram schematically illustrating a top view of an electronic device according to various embodiments of the disclosure.

FIG. 9 is a top view of an electronic device according to various embodiments of the disclosure.

According to various embodiments, the electronic device 900 may include a display 920, a piezoelectric actuator, and a speaker.

According to an embodiment, the piezoelectric actuator may be mounted on the display 920 or a housing 910 in a space inside the electronic device. According to an embodiment, the piezoelectric actuator may provide vibration to the display 920 in response to a signal having a specific frequency. For example, the piezoelectric actuator may provide vibration to the display 920 on the basis of a signal in a high-frequency band. For example, according to the vibration provided by the piezoelectric actuator, the electronic device 900 may provide sounds toward the front surface of the electronic device 900 (for example, the display 920).

According to an embodiment, the speaker may be arranged in a space inside the electronic device 900. For example, the speaker may be arranged in the upper-end area of the electronic device 900. For example, the speaker may output a sound in response to a signal having a specific frequency. For example, the speaker may output a sound on the basis of a signal in a low-frequency band.

According to an embodiment, the electronic device 900 may include an opening 930 on a part of a periphery thereof. For example, the opening 930 may be formed at the center part of the front upper end of the electronic device 900. According to an embodiment, sounds output by the speaker may be discharged out of the electronic device 900 through the opening 930.

According to various embodiments, the opening 930 may be formed in an area on the front surface of the electronic device 900, in which the display 920 and the housing 910 abut each other. For example, the opening 930 may have the shape of a space formed by spacing a part of the housing 910 away from the display 920 by a predetermined extent, from the portion of the housing 910 abutting the display 920. For example, the opening 930 may be a space formed by abutment between the display 920 and a groove obtained by indenting the front housing 910 of the electronic device 900, which surrounds the display 920, away from the display 920.

Figure 10:
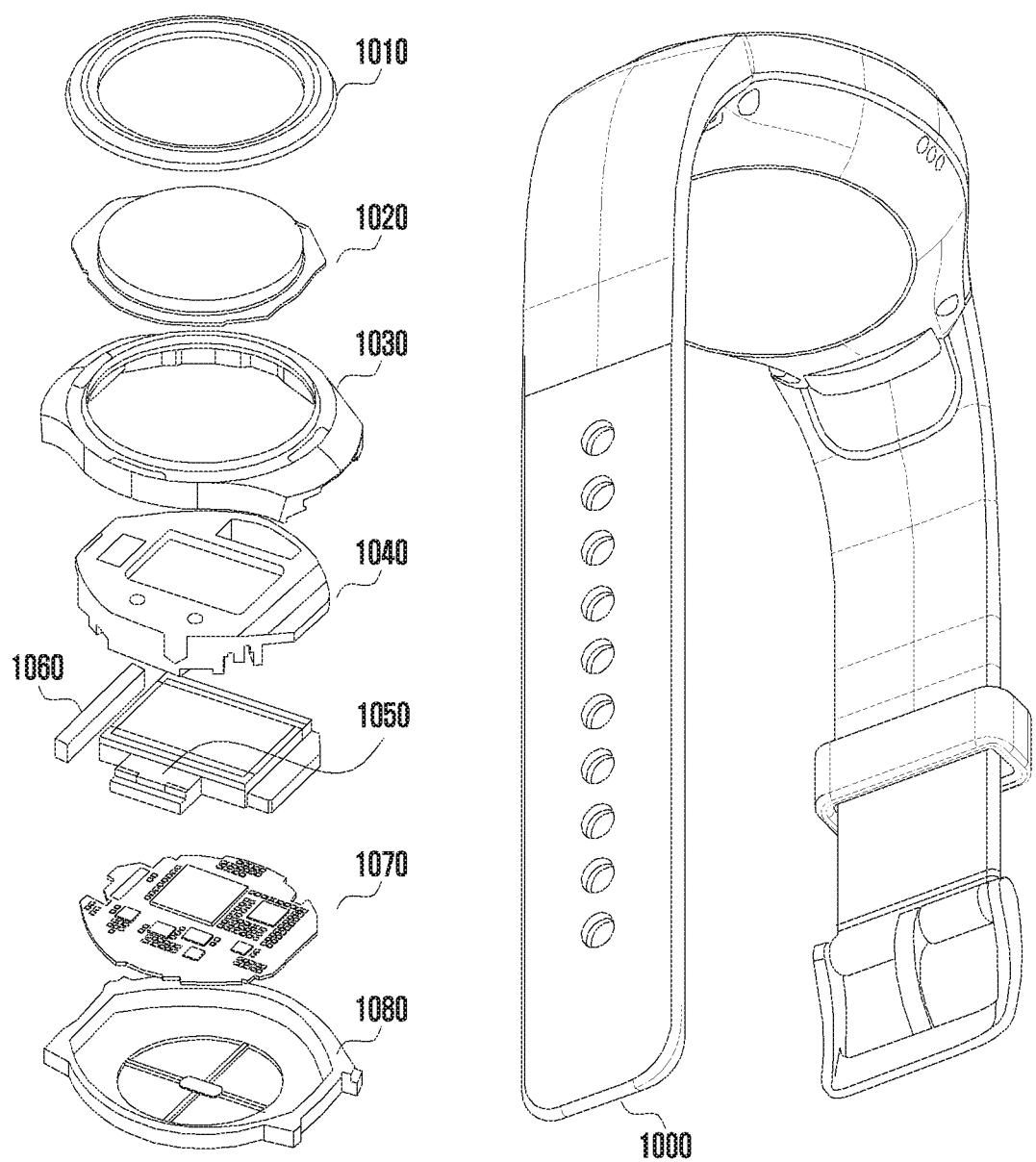
FIG. 10 is an exploded perspective view of an electronic device according to various embodiments of the disclosure.

FIG. 10 is an exploded perspective view of an electronic device according to various embodiments of the disclosure.

The electronic device 1000 (for example, wearable device) according to various embodiments of the disclosure may include a housing assembly 1010, 1030, a display 1020, a retaining member 1040, a speaker 1050, a piezoelectric actuator 1060, a circuit board 1070, and a rear housing 1080.

For example, the electronic device 1000 may have such a structure that the display 1020, the circuit board 1070, and the like are stacked therein. According to an embodiment, the circuit board 1070 may be electrically connected to elements inside the electronic device 1000 (for example, a processor (not illustrated), a battery (not illustrated), the display 1020, the piezoelectric actuator 1060, the speaker 1050, a sensor module (not illustrated), and the like). According to an embodiment, the housing assembly 1010, 1030 and the retaining member 1040 may support or retain the constituent elements inside the electronic device 1000. For example, the housing assembly 1010, 1030 may support or retain the display 1020. The retaining member 1040 may retain or support the constituent elements inside the electronic device 1000 (for example, the speaker 1050, the piezoelectric actuator 1060, or the circuit board 1070).

According to an embodiment, the piezoelectric actuator 1060 may be mounted on the display 1020 inside the electronic device 1000. For example, the piezoelectric actuator 1060 may be mounted in an area of a surface of the display, which is inside the electronic device 1000. According to an embodiment, the piezoelectric actuator 1060 may provide vibration to the display 1020. For example, the electronic device 1000 may provide sounds toward the front surface of the display 1020 by using the vibration transferred to the display 1020 by the piezoelectric actuator 1060. According to an embodiment, the piezoelectric actuator 1060 may receive a signal having a specific frequency band from the processor (not illustrated) of the electronic device 1000 or the audio processing circuit (not illustrated) thereof, and may provide vibration corresponding to the received signal. For example, the piezoelectric actuator 1060 may provide vibration corresponding to a signal in a high-frequency band. For example, the electronic device 1000 may provide a sound in a high-frequency band toward the front surface of the display 1020 by using the vibration provided by the piezoelectric actuator 1060.

According to an embodiment, the speaker 1050 may be arranged in a position adjacent to a periphery of the electronic device 1000, in a space inside the electronic device 1000. According to an embodiment, the speaker 1050 may receive a signal having a specific frequency band from the processor (not illustrated) of the electronic device 1000 or the audio processing circuit (not illustrated) thereof, and may output a sound corresponding to the received signal. For example, the speaker 1050 may output a sound corresponding to a signal in a low-frequency band.

According to an embodiment, an opening may be formed on a side surface of the housing assembly 1010, 1030 or the retaining member 1040 so as to discharge sounds out by the speaker 1050 out of the electronic device 1000. According to an embodiment, the housing assembly 1010, 1030 may further include a structure that forms a sound passage extending from the opening to the speaker 1050.

Figure 11:
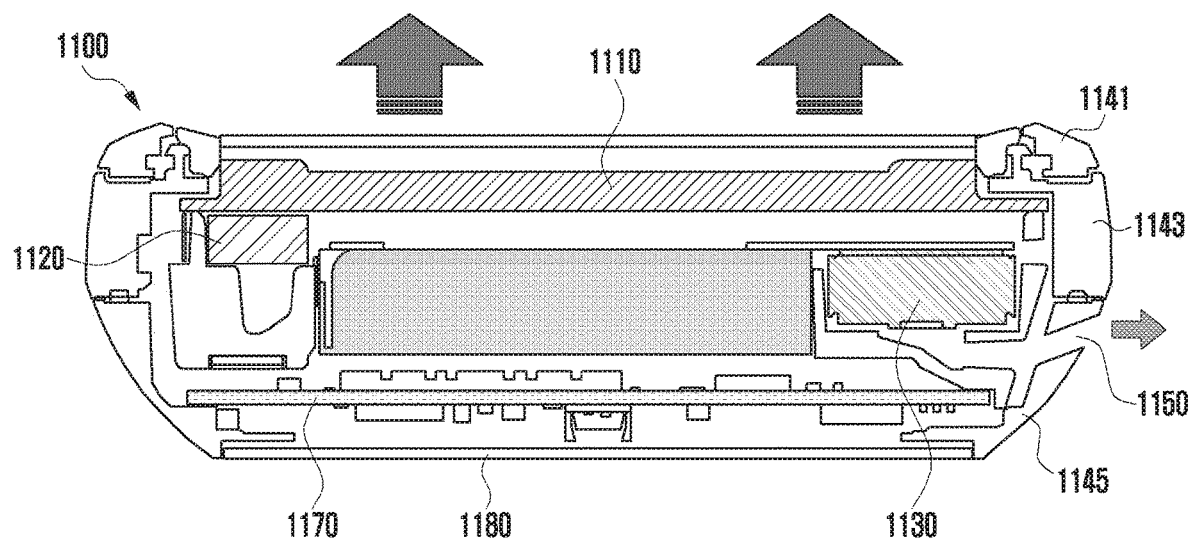
FIG. 11 is a diagram schematically illustrating the section of an electronic device according to various embodiments of the disclosure.

FIG. 11 is a sectional view of an electronic device according to various embodiments of the disclosure.

The electronic device (for example, wearable device) 1100 according to various embodiments of the disclosure may include a display 1110, a piezoelectric actuator 1120, a speaker 1130, housing assemblies 1141, 1143, 1145, a circuit board 1170, and a rear housing 1180. According to an embodiment, the electronic device 1100 may include the display 1110, the piezoelectric actuator 1120, the speaker 1130, the circuit board 1170, and other constituent elements (for example, a processor (not illustrated), a battery (not illustrated), and a sensor module (not illustrated)) therein. For example, the display 1110, the piezoelectric actuator 1120, the speaker 1130, and the circuit board 1170 of the electronic device 1100 may be arranged inside a space formed by the housing assemblies 1141, 1143, 1145 and the rear housing 1180. According to an embodiment, the display 1110, the piezoelectric actuator 1120, the speaker 1130, the circuit board 1170, and other constituent elements (for example, the processor, the memory, and the sensor module) of the electronic device 1100 may be electrically connected to the circuit board 1170.

According to an embodiment, the piezoelectric actuator 1120 may be mounted on the display 1110 or the housing (for example, the housing assemblies 1141, 1143, 1145) inside the electronic device 1100. According to an embodiment, the piezoelectric actuator 1120 may provide vibration to the display 1110. For example, the electronic device 1100 may provide sounds toward the front surface of the display 1110 by using the vibration transferred to the display 11110 by the piezoelectric actuator 1120. According to an embodiment, the piezoelectric actuator 1120 may provide vibration in response to a signal having a specific frequency band. For example, the piezoelectric actuator 1120 may receive a signal having a specific frequency band from the processor or audio processing circuit (not illustrated) of the electronic device 1100, and may provide vibration corresponding to the received signal. For example, the piezoelectric actuator 1120 may provide vibration corresponding to a signal in a high-frequency band. For example, the electronic device 1100 may provide a sound in a high-frequency band toward the front surface of the display 1110 by using the vibration provided by the piezoelectric actuator 1120.

According to an embodiment, the speaker 1130 may be arranged in a position adjacent to a periphery of the display 1110 in a space inside the electronic device 1100. For example, the speaker 1130 may be arranged in a periphery area of the electronic device 1100, inside the electronic device 1100. According to an embodiment, the speaker 1130 may output a sound corresponding to an audio signal. For example, the speaker 1130 may receive a signal having a specific frequency band from the processor (not illustrated) of the electronic device 1100 or from the audio processing circuit (not illustrated) thereof, and may output a sound corresponding to the received signal. For example, the speaker 1130 may output a signal corresponding to a signal in a low-frequency band. According to an embodiment, sounds output by the speaker 1130 may be discharged out of the electronic device 1100 through a gap formed between the housing assemblies 1141, 1143, 1145 of the electronic device 1100, or between the housing assemblies 1141, 1143, 1145 and another constituent element (for example, the display 1110 or the rear housing 1180).

According to an embodiment, the electronic device 1100 may include an opening 1150 for discharging sounds output by the speaker 1130 out of the electronic device 1100. According to various embodiments, the opening 1150 may be formed in an area of the side portion of the electronic device 1100. For example, the opening 150 may be formed on at least a part of the housing assemblies 1141, 1143, 1145. For example, the opening 1150 may be formed perpendicularly to the display 1110 of the electronic device 1100.

According to an embodiment, the electronic device 1100 may further include a structure having a sound passage extending from the opening 1150 to the speaker 1130. For example, the structure may be configured such that sounds discharged from the speaker 1130 are discharged out of the electronic device 1100 through the opening 1150.

According to various embodiments of the disclosure, the electronic device 1100 may provide a sound in a high-frequency band by using the piezoelectric actuator 1120, and may provide a sound in a low-frequency band by using the speaker 1130. For example, if the piezoelectric actuator 1120 is used, low-frequency sounds may not be efficiently provided due to problems related to performance or structure. In addition, in the case of a sound output by the speaker 1130, the same moves in a space inside the electronic device 1100 and is then discharged out of the electronic device 1100. High-frequency sounds have weak diffraction components and thus may not be efficiently provided to the outside of the electronic device 1100. An electronic device 1100 according to various embodiments of the disclosure provides a high-frequency sound by using the piezoelectric actuator 1120 and provides a low-frequency sound by using the speaker 1130, and thus is capable of efficiently providing sounds in all frequency bands (high-frequency band and low-frequency band).

Figure 12A:
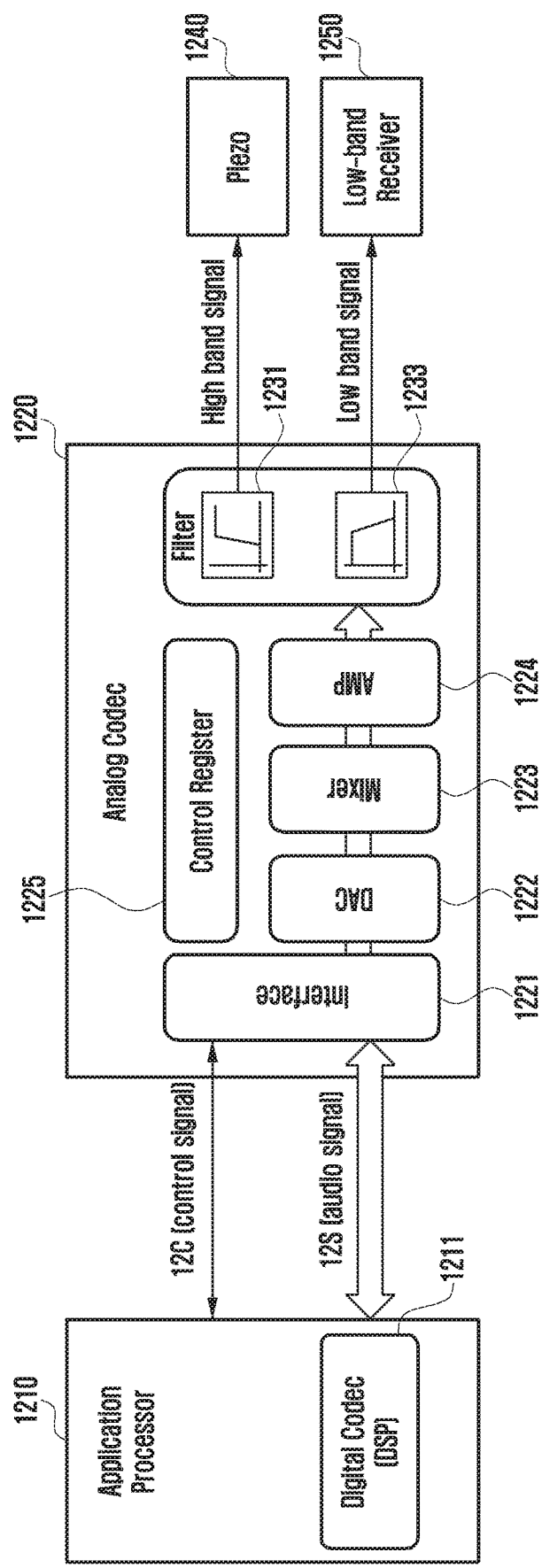
FIG. 12A and FIG. 12B are block diagrams of an electronic device according to various embodiments of the disclosure.
Figure 12B:
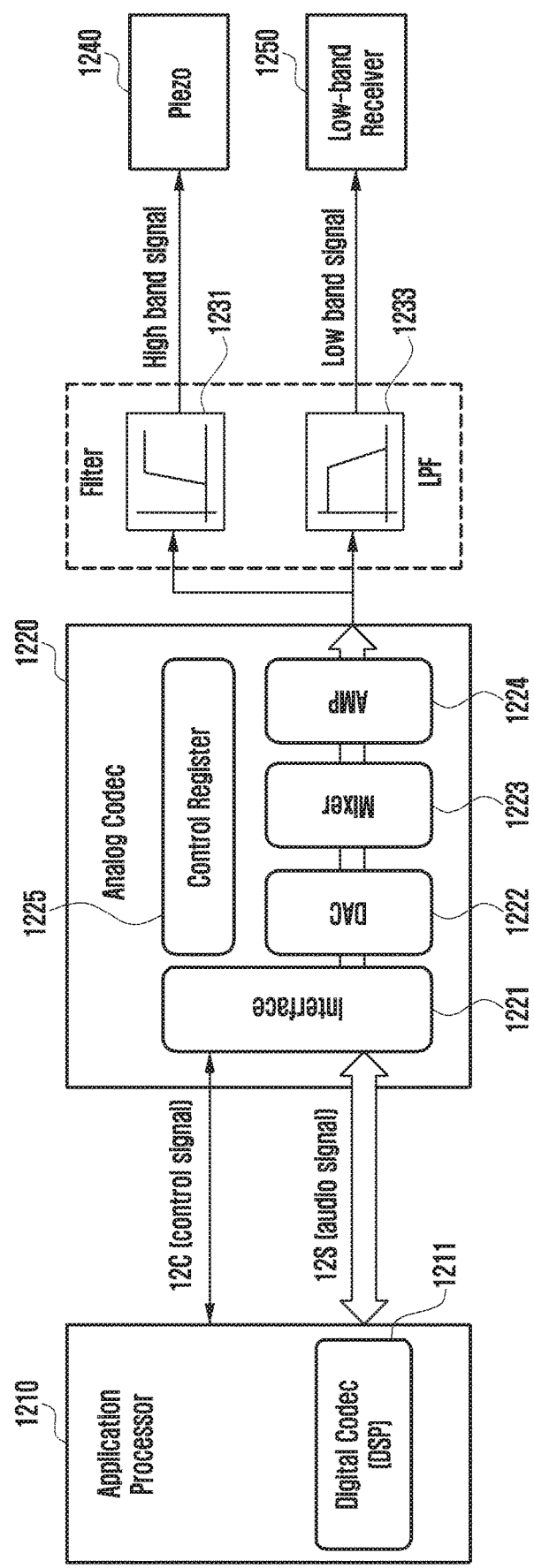

FIG. 12A and FIG. 12B are block diagrams of an electronic device according to various embodiments of the disclosure.

According to an embodiment, the electronic device may include a processor 1210 (for example, an application processor 1210), an analog codec 1220, a first filter 1231, a second filter 1233, a piezoelectric actuator 1240, and a speaker 1250 (receiver).

According to an embodiment, the processor 1210 may transmit a control signal to the analog codec 1220 so as to control the analog codec 1220. According to an embodiment, the processor 1210 may provide an audio signal to the analog codec 1220. For example, the processor 1210 may provide the analog codec 1220 with an audio signal received through a communication circuit (not illustrated), or an audio signal generated or stored inside the electronic device. For example, while providing an audio signal to the analog codec 1220, the processor 1210 may transmit a control signal for processing the audio signal together to the analog codec 1220.

According to an embodiment, the processor 1210 may include a digital codec 1211 (for example, DSP). According to an embodiment, the digital codec 1211 may convert an audio signal into an analog signal or a digital signal, or may encode or decode an audio signal.

According to an embodiment, the analog codec 1220 may include an interface 1221, an inverter 1222, a mixer 1223, an amplifier 1224, and a register 1225. For example, the interface 1221 may receive a control signal or an audio signal from the processor 1210. For example, the inverter 1222 may convert a received digital signal into an analog signal. For example, the mixer 1223 may synthesize multiple received audio signals. The amplifier 1224 may amplify and output the audio signals. For example, the register 1225 may at least temporarily store a control signal or an audio signal received from the processor 1210, or an audio signal processed by the analog codec 1220.

According to various embodiments, the analog codec 1220 may include a first filter 1231 and a second filter 1233. For example, if the analog codec 1220 includes a first filter 1231 and a second filter 1233, an internally processed audio signal (for example, a signal that has passed through the converter, the mixer 1223, or the amplifier 1224) may be transferred to the first filter 1231 and the second filter 1233.

According to various embodiments, the electronic device may include a first filter 1231 and a second filter 1233 separately from the analog codec 1220. According to various embodiments, the first filter 1231 may be electrically connected between the analog codec 1220 and the piezoelectric actuator 1240, and the second filter 1233 may be electrically connected between the analog codex 1220 and the speaker 1250. For example, the first filter 1231 and the second filter 1233 may be passive filters. According to an embodiment, if the analog codec 1220, the first filter 1231, and the second filter 1233 are configured separately, the analog codec 1220 may transfer a processed audio signal to the first filter 1231 and the second filter 1233.

According to various embodiments, the first filter 1231 may include a high-pass filter, and the second filter 1233 may include a low-pass filter. According to an embodiment, the electronic device (for example, the analog codec 1220) may provide an identical audio signal to each of the first filter 1231 and the second filter 1233, may provide a signal in a high-frequency band, which has passed through the first filter 1231 (for example, high-pass filter), to the piezoelectric actuator 1240, and may provide a signal in a low-frequency band, which has passed through the second filter 1233 (for example, low-pass filter), to the speaker 1250.

According to an embodiment, the piezoelectric actuator 1240 may receive a signal in a high-frequency band, and may generate vibration on the basis of the received signal. For example, the piezoelectric actuator 1240 may provide vibration to the display on the basis of a signal in a high-frequency band such that the electronic device provides (outputs) a sound in a high-frequency band toward the front surface of the display.

According to an embodiment, the speaker 1250 may receive a signal in a low-frequency band, and may output a sound on the basis of the received signal. For example, the speaker 1250 may provide (output) a sound in a low-frequency band on the basis of the received signal.

The electronic device according to various embodiments of the disclosure may provide a sound in a high-frequency band and a sound in a low-frequency band by using the piezoelectric actuator 1240 and the speaker 1250, respectively, thereby providing sounds in all frequency bands.

Figure 13:
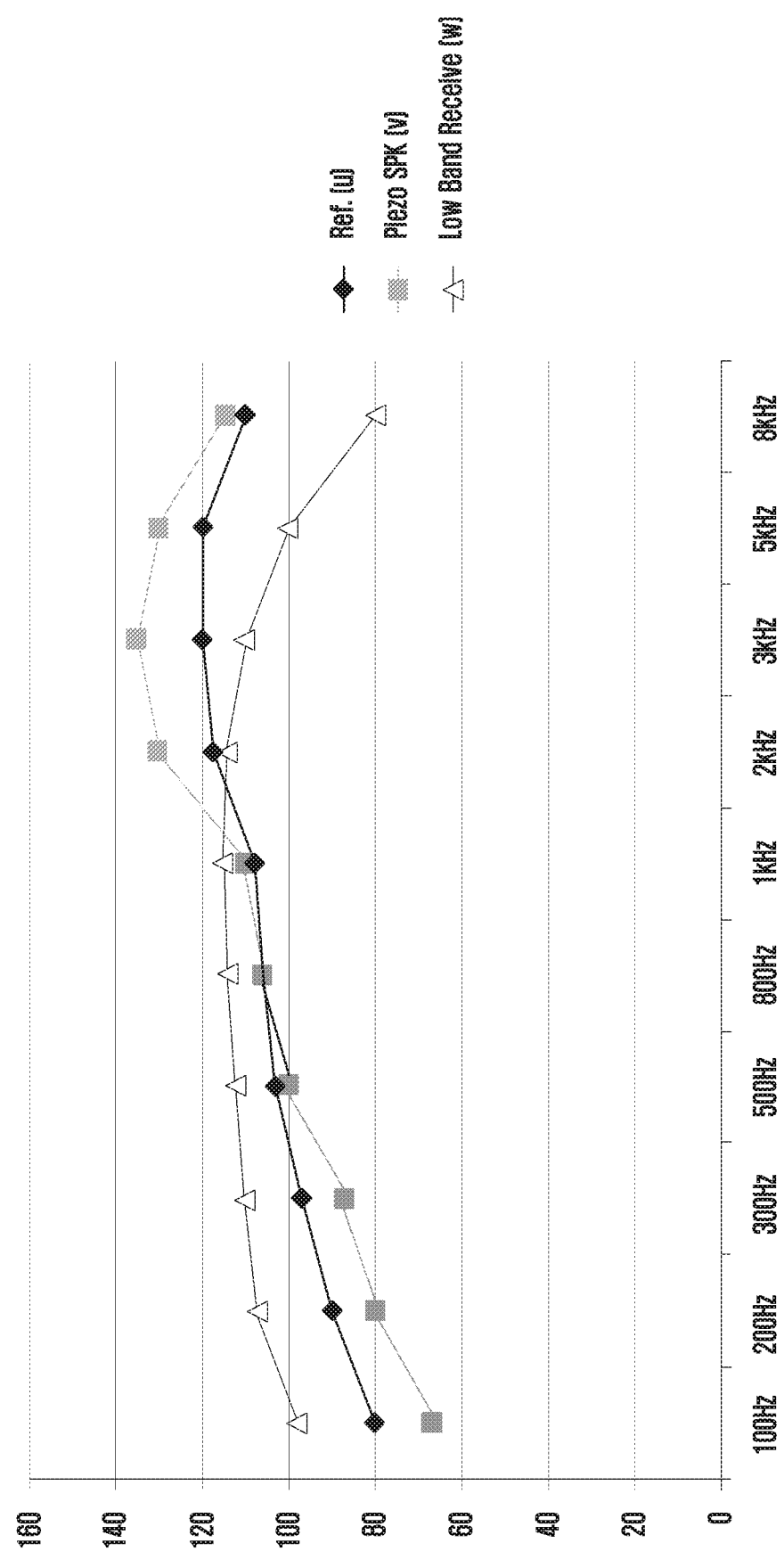
FIG. 13 is a graph illustrating the function of an electronic device according to various embodiments of the disclosure.

FIG. 13 is a graph illustrating the function of an electronic device according to various embodiments of the disclosure.

Referring to FIG. 13, the graph (u) of the reference (Ref) signal indicates the frequency band-specific signal intensity of a signal output by devices in a comparative embodiment (for example, output sound). Referring to the graph (v) of a piezoelectric speaker output signal, if a piezoelectric speaker is used, the output intensity may be relatively stronger in a high-frequency band (for example, about 1 Khz or higher) compared with the reference signal. In contrast, in the case of the piezoelectric speaker, the signal output intensity may be weaker in a low-frequency band (for example, below about 1 khz) compared with the reference signal. Referring to the graph (w) of a signal output from a speaker (for example, low-band receiver), the signal output intensity may be weaker in the high-frequency band compared with the reference signal. In contrast, in the case of the speaker (low-band receiver), the signal output intensity may be stronger in the low-frequency band.

The electronic device according to various embodiments of the disclosure may provide a sound in a high-frequency band by using a piezoelectric actuator (that is, piezoelectric speaker), and may provide a sound in a low-frequency band by using a speaker (for example, a low-band receiver).

According to various embodiments of the disclosure, the electronic device may filter an audio signal by using a filter and then provide the same to the piezoelectric actuator and the speaker. For example, the electronic device may filter an audio signal through a high-pass filter and provide the same to the piezoelectric actuator, and may filter the audio signal through a low-pass filter and provide the same to the speaker. The electronic device according to various embodiments of the disclosure may provide signals having frequencies filtered appropriately according to the performance of the piezoelectric actuator and the speaker.

Figure 14A:
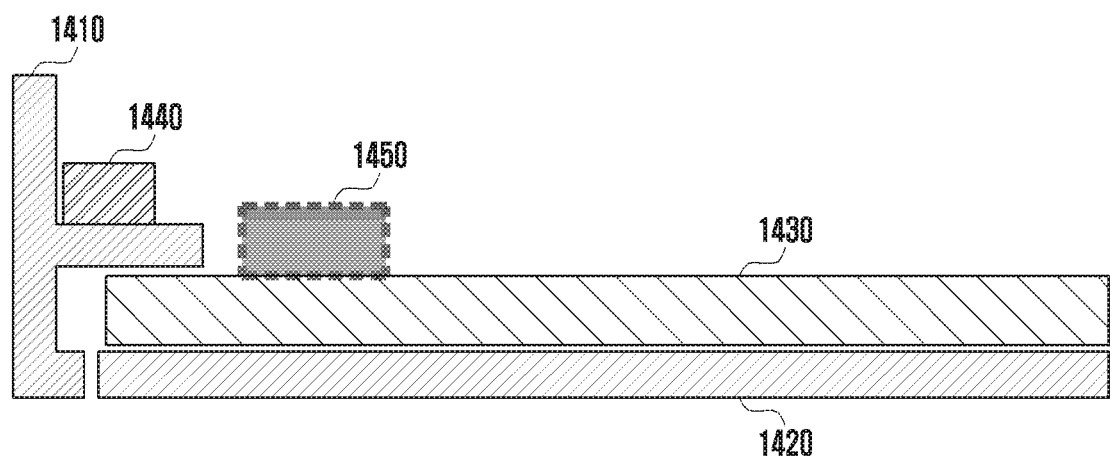
FIG. 14A and FIG. 14B are diagrams schematically illustrating the section of an electronic device according to various embodiments of the disclosure.
Figure 14B:
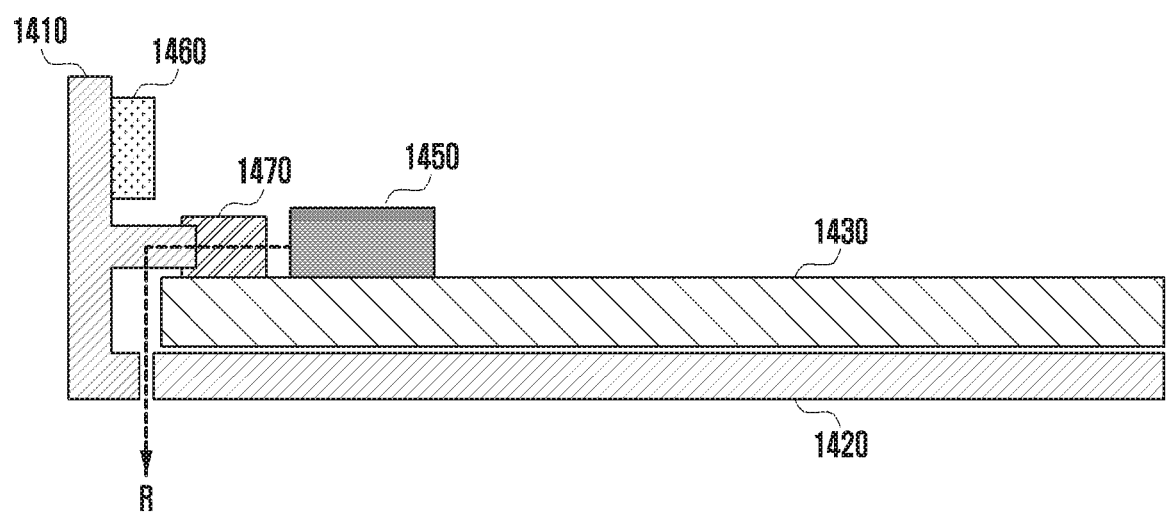

FIG. 14A and FIG. 14B are diagrams schematically illustrating the section of an electronic device according to various embodiments of the disclosure. FIG. 14A and FIG. 14B illustrate the section of a part of the upper end of the electronic device, and the housing on the left side corresponds to the housing on the upper-end periphery of the electronic device.

According to an embodiment, the electronic device may include a housing 1410, a window 1420, a display 1430, a piezoelectric actuator 1440, 1460, and a speaker 1450.

According to an embodiment, the window 1420 may be coupled to the display 12430. For example, the window 1420 and the display 1430 may be formed integrally.

According to an embodiment, the piezoelectric actuator 1440, 1460 may be mounted in an area of the housing 1410 inside the electronic device. According to an embodiment, the piezoelectric actuator 1440, 1460 may receive a signal having a designated frequency, and may provide vibration corresponding to the received signal to the display 1430 or the window 1420. According to an embodiment, the housing may include an area that partially protrudes into the electronic device. The piezoelectric actuator 1440, 1460 may be mounted/arranged on the protruding portion. According to various embodiments, the piezoelectric actuator 1440, 1460 may be arranged in various positions such that the same can provide vibration to the display 1430 or the window 1420.

According to an embodiment, a speaker 1450 may be arranged in a space inside the electronic device. For example, the speaker 1450 may be arranged in an area of the inner upper end of the electronic device. According to an embodiment, the speaker 1450 may output sounds toward the front portion of the electronic device. For example, a sound R output by the speaker 1450 may be discharged out of the electronic device through the space between the housing 1410 and the window 1420 or the display 1430. For example, the space between the housing 1410 and the window 1420 may be a small gap that may be generated between abutting parts of the housing 1410 and the window 1420. According to an embodiment, the electronic device may include an opening on a part of the housing 1410. According to various embodiments, the opening may be formed toward the front portion of the electronic device or toward the side surface of the electronic device. According to an embodiment, the opening may be configured such that sounds output by the speaker 1450 of the electronic device are discharged out of the electronic device more efficiently. According to an embodiment, the speaker 1450 may be arranged adjacent to the gap or the opening. For example, the speaker 1450 may be arranged in a space adjacent to the gap or the opening on a side surface of the display 1430 such that sounds output by the speaker 1450 are directly discharged out of the electronic device through the opening.

According to an embodiment, the electronic device may further include a sensor module 1470 therein. The sensor module 1470 may be arranged in various positions inside the electronic device. According to an embodiment, sounds output by the speaker 1450 may be discharged out of the electronic device through the gap or opening between the housing 1410 and the display 1430 (or the window 1420) while avoiding the sensor module 1470.

According to an embodiment, the electronic device may further include a structure (not illustrated) that forms a sound passage extending from the gap or opening between the housing 1410 and the display 1430 (or the window 1420) to the speaker 1450. According to an embodiment, the structure may be connected or coupled to the speaker 1450. According to an embodiment, the structure may have such a structure or shape that the speaker 1450 can be mounted therein. For example, if the structure is absent, sounds output by the speaker 1450 may diffuse in an arbitrary direction in an empty space inside the electronic device. According to an embodiment, the structure may efficiently transfer sounds output by the speaker 1450 up to the gap or opening between the housing 1410 and the window 1420. For example, the structure may prevent sounds output by the speaker 1450 from being discharged into another space inside the electronic device, and may induce the sounds output by the speaker 1450 in a desired direction (for example, out of the electronic device). According to an embodiment, the structure of the electronic device may include a sound passage formed such that sounds output by the speaker 1450 are discharged out of the electronic device through the gap or opening between the housing 1410 and the display 1430 (or the window 1420) while avoiding the space in which the sensor module 1470 is arranged.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
    a housing comprising a first plate disposed in a front direction of the electronic device, a second plate spaced apart from the first plate, and a side member surrounding a space between the first plate and the second plate, the side member being separated from or integrated with the second plate;
    a display exposed through a part of the first plate;
    a communication circuit arranged inside the space;
    a piezoelectric actuator arranged inside the space so as to provide vibration to the first plate such that sounds by the vibration of the first plate are output in the front direction of the electronic device;
    a speaker arranged inside the space in a position adjacent to a periphery of the first plate;
    an audio processing circuit arranged in the space and electrically connected to the piezoelectric actuator and the speaker;
    a processor arranged inside the space and electrically connected to the display, the communication circuit, and the audio processing circuit; and
    a memory arranged inside the space and electrically connected to the processor,
    wherein the memory comprises instructions that, when executed, cause the processor to:
        wirelessly connect to an external device by using the communication circuit,
        receive an audio signal through the communication circuit, and
        provide the audio signal to the audio processing circuit,
    wherein the audio processing circuit is configured to:
        provide a first signal having a first frequency band to the piezoelectric actuator at least partially on the basis of the audio signal, and
        provide a second signal having a second frequency band, which is lower than the first frequency band, to the speaker,
    wherein the piezoelectric actuator and the speaker are disposed between the display and the second plate,
    wherein the housing includes an opening formed in the first plate or formed adjacent to the first plate and a structure configured to form a sound passage which extends from the opening to the speaker, and
    wherein the sound passage has at least two perpendicular passageways that sound must travel through between the speaker and the opening.

2. The electronic device of claim 1,
    wherein the audio processing circuit comprises an analog codec, a first filter, and a second filter,
    wherein the first filter is electrically connected between the analog codec and the piezoelectric actuator, and
    wherein the second filter is electrically connected between the analog codec and the speaker.

3. The electronic device of claim 2, wherein the first filter comprises a high-pass filter, and the second filter comprises a low-pass filter.

4. The electronic device of claim 3, wherein the audio processing circuit is configured to:
    provide a signal, which is obtained by filtering the audio signal by using the first filter, to the piezoelectric actuator, and
    provide a signal, which is obtained by filtering the audio signal by using the second filter, to the speaker.

5. The electronic device of claim 1, wherein the piezoelectric actuator is mounted on the display.

6. The electronic device of claim 5, wherein the piezoelectric actuator is mounted on one surface of the display, which faces the space.

7. The electronic device of claim 1,
    wherein the structure is configured to:
        form a first sound passage, which extends from the opening in a first direction, and
        form a second sound passage, which extends from a part of the first sound passage to the speaker in a second direction, and
    wherein the second direction is different from the first direction.

8. The electronic device of claim 7, wherein the second direction is substantially perpendicular to the first direction.

9. The electronic device of claim 7, wherein the opening is formed on a part of a boundary between the first plate and the side member.

10. The electronic device of claim 9, wherein the opening is formed at an upper-end center of the first plate.

11. The electronic device of claim 7 wherein the opening is formed to abut a center part of an upper-end boundary of the display.

12. The electronic device of claim 7,
    wherein the electronic device further comprises a sensor arranged at an upper-end center inside the space, and
    wherein the first sound passage and the second sound passage are connected from the opening to the speaker while avoiding an area in which the sensor is arranged.

13. An electronic device comprising:
    a housing comprising a first plate disposed in a front direction of the electronic device, a second plate spaced apart from the first plate, and a side member surrounding a space between the first plate and the second plate;
    a display exposed through a part of the first plate;
    a piezoelectric actuator arranged inside the space so as to provide vibration to the first plate such that sounds by the vibration of the first plate are output in the front direction of the electronic device;
    a speaker arranged inside the space;
    an audio processing circuit arranged inside the space and electrically connected to the piezoelectric actuator and the speaker;
    a processor arranged inside the space and electrically connected to the display and the audio processing circuit; and
    a memory arranged inside the space and electrically connected to the processor,
    wherein the memory comprises instructions that, when executed, cause the processor to provide an audio signal to the audio processing circuit,
    wherein the audio processing circuit is configured to:
        provide a first signal having a first frequency band to the piezoelectric actuator at least partially on the basis of the audio signal, and
        provide a second signal having a second frequency band, which is lower than the first frequency band, to the speaker,
    wherein the piezoelectric actuator and the speaker are disposed between the display and the second plate,
    wherein the housing includes an opening formed in the first plate or formed adjacent to the first plate and a structure configured to form a sound passage which extends from the opening to the speaker, and wherein the sound passage has at least two perpendicular passageways that sound must travel through between the speaker and the opening.

14. An electronic device comprising:
a housing;
a display arranged inside the housing and at least partially exposed in a front direction of the electronic device;
a piezoelectric actuator arranged on the display inside the housing so as to provide vibration to the display such that sounds by the vibration of the display are output in the front direction of the electronic device;
a speaker arranged inside the housing;
an audio processing circuit electrically connected to the piezoelectric actuator and the speaker;
a processor arranged inside the housing and electrically connected to the display and the audio processing circuit; and
a memory arranged inside the housing and electrically connected to the processor,
wherein the memory comprises instructions that, when executed, cause the processor to provide a signal corresponding to an audio signal to the piezoelectric actuator and to the speaker by using the audio processing circuit,
wherein the piezoelectric actuator is configured to provide vibration in a first frequency band on the basis of the signal corresponding to the audio signal,
wherein the speaker is configured to output a sound in a second frequency band, which is lower than the first frequency band, on the basis of the signal corresponding to the audio signal,
wherein the piezoelectric actuator and the speaker are disposed between the display and a second plate,
wherein the housing includes an opening formed in a front surface of housing adjacent to the display and a structure configured to form a sound passage which extends from the opening to the speaker, and
wherein the sound passage has at least two perpendicular passageways that sound must travel through between the speaker and the opening.

15. The electronic device of claim 14, wherein the sound passage of the structure comprises a first sound passage extending in a first direction from the speaker to one surface of the housing, and a second sound passage extending in a second direction from a part of the first sound passage to the opening.

16. The electronic device of claim 14,
wherein the audio processing circuit comprises a first filter configured to filter a first frequency band and a second filter configured to filter a second frequency band, and
wherein the processor is configured to use the audio processing circuit so as to provide the signal corresponding to the audio signal, which is filtered by using the first filter, to the piezoelectric actuator and to provide the signal corresponding to the audio signal, which is filtered by using the second filter, to the speaker.

* * * * *